US012792689B2

(12) United States Patent
Yamazaki et al.

(10) Patent No.: US 12,792,689 B2
(45) Date of Patent: Nov. 10, 2026

(54) RECORDING MEDIUM, INFORMATION PROCESSING METHOD, AND INFORMATION PROCESSING APPARATUS

(71) Applicant: FUJITSU LIMITED, Kawasaki (JP)

(72) Inventors: Takashi Yamazaki, Kawasaki (JP); Yusuke Oishi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 1288 days.

(21) Appl. No.: 17/685,491

(22) Filed: Mar. 3, 2022

(65) Prior Publication Data

US 2022/0309128 A1 Sep. 29, 2022

(30) Foreign Application Priority Data

Mar. 23, 2021 (JP) ................................. 2021-048080

(51) Int. Cl.
*G06F 17/16* (2006.01)

(52) U.S. Cl.
CPC .................................... *G06F 17/16* (2013.01)

(58) Field of Classification Search
CPC ......... G06N 20/00; G06F 17/16; G06F 7/487; G06F 5/01; G06F 2207/4824
See application file for complete search history.

(56) References Cited

U.S. PATENT DOCUMENTS

2012/0221303 A1 8/2012 Wallis et al.
2016/0202389 A1 7/2016 Malvesin et al.
2020/0193274 A1* 6/2020 Darvish Rouhani .. G06N 3/063
2022/0121909 A1* 4/2022 Zhang ..................... G06F 17/16
2022/0129521 A1* 4/2022 Surti ................... G06F 12/0862

FOREIGN PATENT DOCUMENTS

JP 2005-115497 A 4/2005

OTHER PUBLICATIONS

D. Radečić, Data Scaling for Machine Learning, The Essential Guide, Towards Data Science, https://towardsdatascience.com/data-scaling-for-machine-learning-the-essential-guide-d6cfda3e3d6b/ (Year: 2020).*

A. Kipf et al., Learned Cardinalities: Estimating Correlated Joins with Deep Learning, Conference on Innovative Data Systems Research, Asilomar, California, USA (Year: 2019).*

(Continued)

*Primary Examiner* — Michael D. Yaary
(74) *Attorney, Agent, or Firm* — Fujitsu Intellectual Property Center

(57) ABSTRACT

A non-transitory computer-readable recording medium storing an information processing program that causes at least one computer to execute a process, the process includes, acquiring a matrix forming a certain matrix equation; dividing the matrix into a plurality of blocks each including an element having a certain attribute based on an attribute of each element of a plurality of elements included in the matrix; changing a scale of each element of the plurality of elements included in each block of the plurality of blocks; and setting the matrix after the scale is changed to a target to be inputted to a machine learning model that performs a matrix operation.

8 Claims, 27 Drawing Sheets

(56) References Cited

OTHER PUBLICATIONS

L. Zhao et al. Block-Sparse Coding-Based Machine Learning Approach for Dependable Device Free Localization in IoT Environment, IEEE Internet of Things Journal, vol. 8, No. 5. (Year: 2021).*
D. Greenfeld et al. "Learning to Optimize Multigrid PDE Solvers," Proceedings of the 36th International Conference on Machine Learning, Long Beach, California (Year: 2019).*
Scikit-Learn, Scikit-learn User Guide, Release 0.22.2 (Year: 2020).*
A. Valkanas, GitHub "Matrix-Vector-Equation-Neural-Network-Solution-Approximation" (Year: 2018).*
Guo Xiaoxiao et al., "Convolutional Neural Networks for Steady Flow Approximation", Proceedings of the 22nd ACM SIGKDD International Conference on Knowledge Discovery and Data Mining, Aug. 13-17, 2016, pp. 481-490 (Total 11 pages).
Lubor Ladicky et al., "Data-driven Fluid Simulations using Regression Forests", ACM Transactions on Graphics, Oct. 2015, Article No. 199 (Total 9 pages).
Kenya Yamada et al., "Method for Automatically Tuning Numerical Calculation Library with Deep Learning Using Sparse-Matrix-Shape Color Image as Input", IPSJ SIG Technical Report, vol. 2017-HPC-162, No. 24, pp. 1-8, Dec. 19, 2017, 2017 Information Processing Society of Japan (Total 10 pages).
Jae-Seung Yeom et al., "Data-driven Performance Modeling of Linear Solvers for Sparse Matrices", 2016 7th International Workshop on Performance Modeling, Benchmarking and Simulation of High Performance Computer Systems (PMBS) (Total 11 pages).
Sanjukta Bhowmick et al., "Application of Machine Learning in Selecting Sparse Linear Solvers", International Journal of High Performance Computing Applications (submitted), 2006 (Total 24 pages).
Federico, Danieli et al., "Space-time block preconditioning for incompressible flow", arxiv.org, Cornell Juniversity Library, Jan. 18, 2021, pp. 1-27, XP081861696.
Silvester, David J. et al.,"A Black-Box Multigrid Preconditioner for the Biharmonic Equation", Bit Numerical Mathematics, Kluwer Academic Publishers, vol. 44, Jan. 1, 2004, pp. 151-163, XP019360255.
Wan, T. et al.,"Data-sparse LU-decomposition preconditioning combined with multilevel fast multipole method for electromagnetic scattering problems", IET Microwaves, Antennas & Propagation, vol. 5, No. 11, Aug. 19, 2011, pp. 1288-1296, XP006041923.
Extended European Search Report dated Aug. 5, 2022 for corresponding to European Patent Application No. 22159137.3, 9 pages.

* cited by examiner

RECORDING MEDIUM, INFORMATION PROCESSING METHOD, AND INFORMATION PROCESSING APPARATUS

CROSS-REFERENCE TO RELATED APPLICATION

This application is based upon and claims the benefit of priority of the prior Japanese Patent Application No. 2021-48080, filed on Mar. 23, 2021, the entire contents of which are incorporated herein by reference.

FIELD

The embodiment discussed herein is related to a recording medium, an information processing method, and an information processing apparatus.

BACKGROUND

In the past, machine learning has sometimes been used for solving a matrix equation. For example, in order to solve a matrix equation of Ax=b for x, a machine learning model that outputs a prediction value for x corresponding to A and b that are inputted may be generated by machine learning for use. A is an n×n-dimensional matrix. b and x are n×1-dimensional matrices.

As related art, there is a technology that uses, for example, a neural network called convolutional neural networks (CNN) for solving a flow-field pattern in a steady flow simulation.

Guo, Xiaoxiao, Wei Li, and Francesco Iorio. "Convolutional neural networks for steady flow approximation." Proceedings of the 22nd ACM SIGKDD international conference on knowledge discovery and data mining, 2016 is disclosed as related art.

SUMMARY

According to an aspect of the embodiments, a non-transitory computer-readable recording medium storing an information processing program that causes at least one computer to execute a process, the process includes, acquiring a matrix forming a certain matrix equation; dividing the matrix into a plurality of blocks each including an element having a certain attribute based on an attribute of each element of a plurality of elements included in the matrix; changing a scale of each element of the plurality of elements included in each block of the plurality of blocks; and setting the matrix after the scale is changed to a target to be inputted to a machine learning model that performs a matrix operation.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

With the technology in the past, the solving precision of a machine learning model may sometimes be low. For example, when a plurality of elements having different orders from each other is included in an n×n-dimensional matrix A forming a matrix equation, there is a tendency that generating a machine learning model having high solving precision is difficult.

According to one aspect, it is an object of an embodiment to improve the solving precision of a machine learning model.

According to one aspect, the solving precision of a machine learning model may be improved.

Hereinafter, embodiments of an information processing program, an information processing method, an information processing apparatus according to the present disclosure are described in detail with reference to drawings.

(Example of Information Processing Method According to Embodiment)

Figure 1:
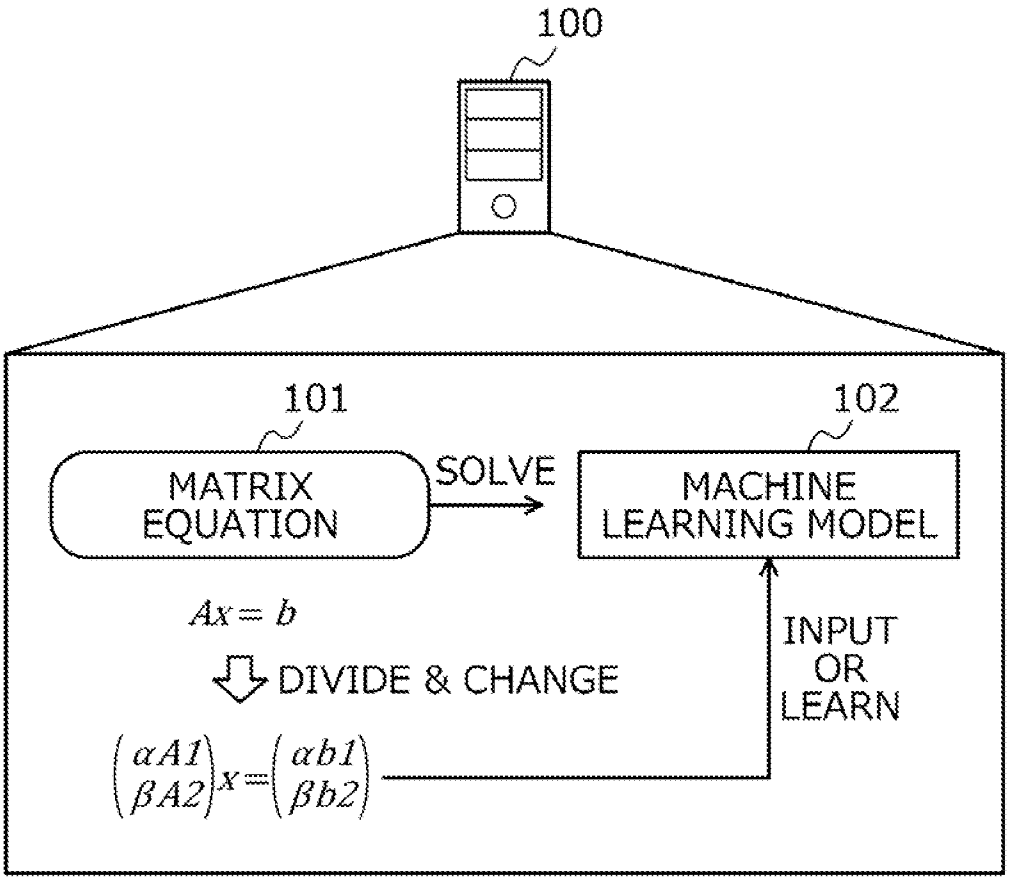
FIG. 1 is an explanatory diagram illustrating an example of an information processing method according to an embodiment.

FIG. 1 is an explanatory diagram illustrating an example of an information processing method according to an embodiment. An information processing apparatus 100 is a computer for improving the solving precision of a machine learning model. The information processing apparatus 100 is, for example, a server, a personal computer (PC), or the like.

In solving a matrix equation, a machine learning model may be generated by machine learning and be used. Such a machine learning model may be generated and be used for solving a matrix equation in, for example, a numerical simulation.

For example, in many numerical simulations, after a matrix equation is generated by discretizing and further linearizing a system of nonlinear partial differential equations, that is a target to be solved, the matrix equation is solved by using a matrix equation solver. As the matrix equation solver, an iterative solution technique is often used especially for large-sized problems. In order to accelerate such an iterative solution technique, a machine learning model may be utilized for a numerical simulation. The linearization is achieved by, for example, Newton-Raphson (NR) method or the like. As the iterative solution technique, static methods such as Gauss-Seidel (GS) method and successive over-relaxation (SOR) method, for example, are possible. As the iterative solution technique, dynamic methods such as conjugate gradient (CG) method and generalized minimal residual (GMRES) method, for example, are possible. The iterative solution technique is, for example, a method that repeats the step of approximating solutions of a matrix equation from an initial value until convergence.

However, with the method in the past, the solving precision of a machine learning model may sometimes be low. For example, when a plurality of elements having different attributes from each other is included in a matrix forming a matrix equation, generating a machine learning model having high solving precision is difficult. Examples of a matrix forming a matrix equation include a coefficient matrix representing a coefficient, a right-side matrix representing a right side, and a solution matrix representing a solution.

For example, when a plurality of elements having different orders from each other is included in a matrix forming a matrix equation, generating a machine learning model having high solving precision is difficult. For example, since the magnitude of a variation of each element of a plurality of elements having different orders from each other included in a matrix forming a matrix equation differs, generating a machine learning model having high solving precision is difficult.

For example, since the magnitude of a variation of each element included in a matrix forming a matrix equation differs between steps of the iterative solution technique, generating a machine learning model having high solving precision is difficult. For example, a numerical simulation that solves a matrix equation representing a predetermined target along time variations is repeated in some cases. In such a case, since the magnitude of a variation of each element included in a matrix forming a matrix equation differs between numerical simulations, generating a machine learning model having high solving precision is difficult.

To address this, a method that shifts data to be used for acquiring a uniform average value, for example, may be applied to a matrix forming a matrix equation, but the meaning of the matrix equation changes, which makes the generation of a machine learning model having high solving precision difficult. Although a method that multiplies whole data by a constant, which is used for achieving a uniform distribution, for example, may be applied to a matrix forming a matrix equation, relatively small elements in the matrix forming the matrix equation are easily undervalued.

Accordingly, according to an embodiment, an information processing method will be described in which scales are matched among elements included in a matrix to improve the solving precision of a machine learning model.

Referring to FIG. 1, (1-1) the information processing apparatus 100 acquires a matrix forming a predetermined matrix equation 101. The information processing apparatus 100 acquires, for example, each matrix of a first matrix representing a coefficient of the predetermined matrix equation 101 and a third matrix representing a product of the first matrix and a second matrix representing a solution to the predetermined matrix equation 101. The first matrix is, for example, a coefficient matrix A. The second matrix is, for example, a solution vector x. The third matrix is, for example, a right-side vector b. FIG. 1 illustrates an example in which the information processing apparatus 100 acquires the coefficient matrix A and the right-side vector b forming the predetermined matrix equation 101.

(1-2) Based on an attribute of each element of a plurality of elements included in the acquired matrix, the information processing apparatus 100 sorts and divides the acquired matrix into a plurality of blocks each including elements having an identical attribute. The attribute is, for example, information indicating what kind of physical amount the element has. The attribute may be a magnitude of the order of the element. In the example in FIG. 1, the information processing apparatus 100 divides the coefficient matrix A into a block A1 and a block A2 and divides the right-side vector b into a block b1 and a block b2.

(1-3) The information processing apparatus 100 changes the scale of each element of the plurality of elements included in each block of the plurality of divided blocks. For example, based on the size of at least one element included in each block of the plurality of divided blocks, the information processing apparatus 100 changes the scale of each element included in the plurality of elements included in the block.

In the example in FIG. 1, the information processing apparatus 100 sets a scaling factor α based on the size of at least one element included in the block A1 and the block b1. By multiplying the block A1 and the block b1 by the set scaling factor α, the information processing apparatus 100 changes the scales of the block A1 and the block b1.

The information processing apparatus 100 sets a scaling factor βbased on the size of at least one element included in the block A2 and the block b2. By multiplying the block A2 and the block b2 by the set scaling factor β, the information processing apparatus 100 changes the scales of the block A2 and the block b2.

(1-4) The information processing apparatus 100 sets the matrix after the scale of each element of the plurality of elements included in each of the blocks is changed to a target to be inputted to a machine learning model 102 that performs a matrix operation. The target to be inputted is a matrix to be inputted to the machine learning model 102 when, for example, the machine learning model 102 is to be updated.

Thus, the information processing apparatus 100 may learn the machine learning model 102 having relatively high solving precision because the scales may be matched among elements in a matrix to be inputted to the machine learning model 102 when the machine learning model 102 is learned.

Having described that the target to be inputted is a matrix to be inputted to the machine learning model 102 when the machine learning model 102 is to be updated, the target to be inputted is not limited thereto. For example, the target to be inputted may be a matrix to be inputted to the machine learning model 102 when the solution vector x forming the predetermined matrix equation 101 is acquired by solving the predetermined matrix equation 101 using the machine learning model 102.

Thus, because the scales may be matched among elements in a matrix to be inputted to the machine learning model 102 for solving the solution vector x, the information processing apparatus 100 may improve the solving precision of the machine learning model 102.

Having described the case where the information processing apparatus 100 acquires each matrix of the first matrix and the third matrix, it is not limited thereto. For example, the information processing apparatus 100 may acquire the second matrix. For example, the information processing apparatus 100 may acquire the solution vector x.

(Example of Information Processing System 200)

An example of an information processing system 200 to which the information processing apparatus 100 illustrated in FIG. 1 is applied will be described next with reference to FIG. 2.

Figure 2:
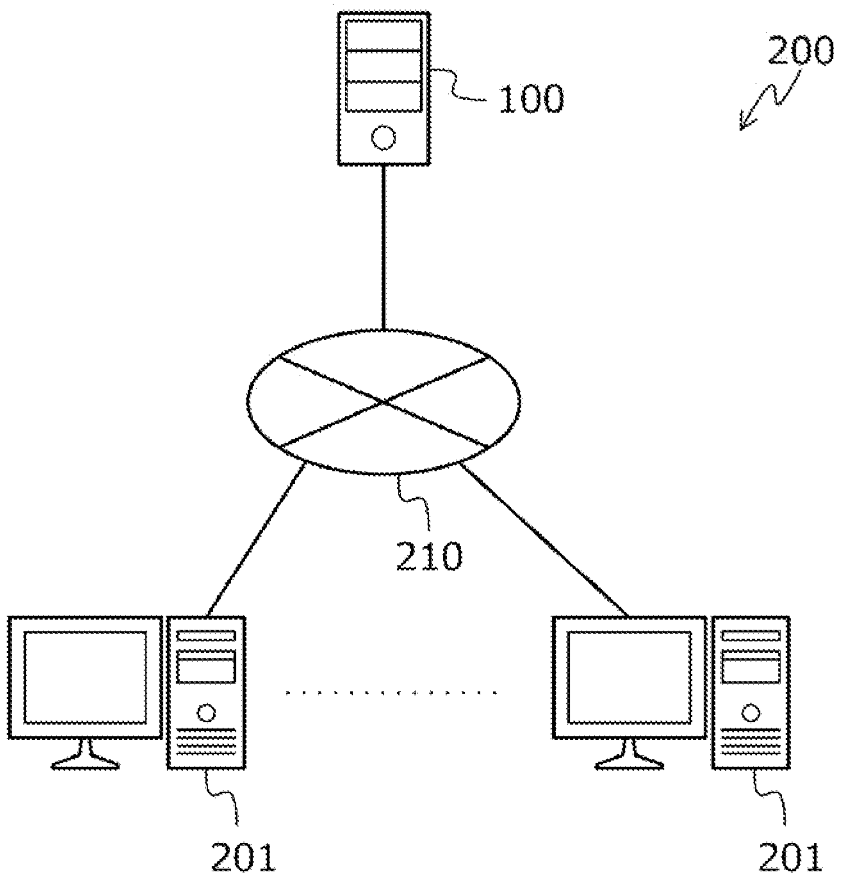
FIG. 2 is an explanatory diagram illustrating an example of an information processing system.

FIG. 2 is an explanatory diagram illustrating an example of the information processing system 200. Referring to FIG. 2, the information processing system 200 includes the information processing apparatus 100 and client apparatuses 201.

In the information processing system 200, the information processing apparatus 100 is coupled to the client apparatuses 201 via a network 210 that is wired or wireless. The network 210 is, for example, a local area network (LAN), a wide area network (WAN), the Internet, or the like.

The information processing apparatus 100 receives from the client apparatus 201 a request to solve a matrix equation, for example. The information processing apparatus 100, for example, calculates a solution to the matrix equation in response to the request and transmits the solution to the client apparatus 201. For example, the information processing apparatus 100 receives from the client apparatus 201 a request to start a numerical simulation. For example, the information processing apparatus 100 executes the numerical simulation, in which the solution of the whole problem must be kept updated by solving sequence of linear equations, in response to the request, calculates a solution to the matrix equation, and transmits the solution to the client apparatus 201.

For example, in the numerical simulation, the information processing apparatus 100 in any step of the iterative solution technique calculates a provisional solution to the matrix equation by performing numerical analysis and, with the provisional solution to the matrix equation, updates the machine learning model that solves the matrix equation. The information processing apparatus 100, for example, calculates a provisional solution to the matrix equation by using the machine learning model in any step of the iterative solution technique in the numerical simulation. For example, the information processing apparatus 100 transmits to the client apparatus 201 a final solution to the matrix equation, as the solution of the numerical simulation. The information processing apparatus 100 is, for example, a server, a PC, or the like.

The client apparatus 201 is a computer that transmits a request to solve a matrix equation, for example, to the information processing apparatus 100. The client apparatus 201 receives and outputs, for example, a solution to a matrix equation from the information processing apparatus 100. For example, the client apparatus 201 transmits to the information processing apparatus 100 a request to start a numerical simulation. For example, the client apparatus 201 receives from the information processing apparatus 100 and outputs a solution to a matrix equation as the solution of the numerical simulation. The client apparatus 201 is, for example, a PC, a tablet terminal, a smartphone, or the like.

Having described the case where the information processing apparatus 100 alone performs processing of generating a machine learning model and processing of utilizing the machine learning model, embodiments are not limited thereto. For example, there may be a case where a plurality of the information processing apparatuses 100 exists and the information processing apparatuses 100 share the processing of generating a machine learning model and the processing of utilizing the machine learning model.

(Hardware Configuration Example of Information Processing Apparatus 100)

Next, a hardware configuration example of the information processing apparatus 100 will be described with reference to FIG. 3.

Figure 3:
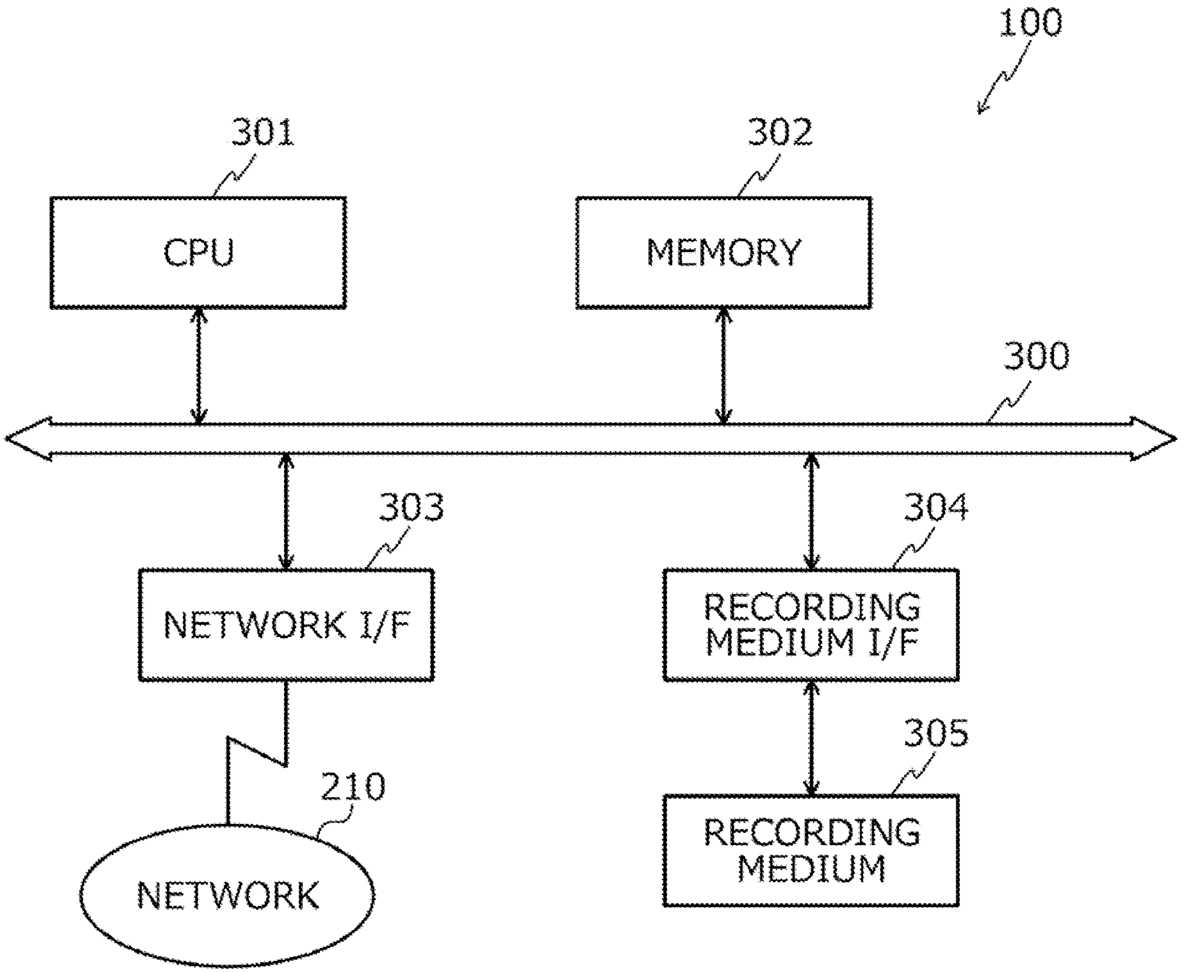
FIG. 3 is a block diagram illustrating a hardware configuration example of an information processing apparatus.

FIG. 3 is a block diagram illustrating the hardware configuration example of the information processing apparatus 100. Referring to FIG. 3, the information processing apparatus 100 includes a central processing unit (CPU) 301, a memory 302, a network interface (I/F) 303, a recording medium I/F 304, and a recording medium 305. The individual components are coupled to one another through a bus 300.

The CPU 301 controls the entire information processing apparatus 100. The memory 302 includes, for example, a read-only memory (ROM), a random-access memory (RAM), a flash ROM, and the like. For example, the flash ROM and the ROM store various programs, and the RAM is used as a work area of the CPU 301. The program stored in the memory 302 are loaded into the CPU 301 and causes the CPU 301 to execute coded processes.

The network I/F 303 is coupled to the network 210 through a communication line and is coupled to another computer via the network 210. The network I/F 303 controls the network 210 and an internal interface so as to control an input and an output of data from and to the other computer. The network I/F 303 is, for example, a modem, a LAN adapter, or the like.

The recording medium I/F 304 controls reading/writing of data from/to the recording medium 305 under the control of the CPU 301. The recording medium I/F 304 is, for example, a disk drive, a solid-state drive (SSD), a Universal Serial Bus (USB) port, or the like. The recording medium 305 is a non-volatile memory that stores data written under the control of the recording medium I/F 304. The recording medium 305 is, for example, a disk, a semiconductor memory, a USB memory, or the like. The recording medium 305 may be detachable from the information processing apparatus 100.

In addition to the components described above, the information processing apparatus 100 may include, for example, GPU or FPGA as an accelerator, and other parts like a keyboard, a mouse, a display, a printer, a scanner, a microphone, a speaker, and the like. The information processing apparatus 100 may include a plurality of recording medium I/Fs 304 and a plurality of recording media 305. The information processing apparatus 100 may not include the recording medium I/F 304 and the recording medium 305.

(Hardware Configuration Example of Client Apparatus 201)

A hardware configuration example of the client apparatus 201 is the same as, for example, the hardware configuration example of the information processing apparatus 100 illustrated in FIG. 3, and thus description thereof will be omitted.

(Functional Configuration Example of Information Processing Apparatus 100)

Next, a functional configuration example of the information processing apparatus 100 will be described with reference to FIG. 4.

Figure 4:
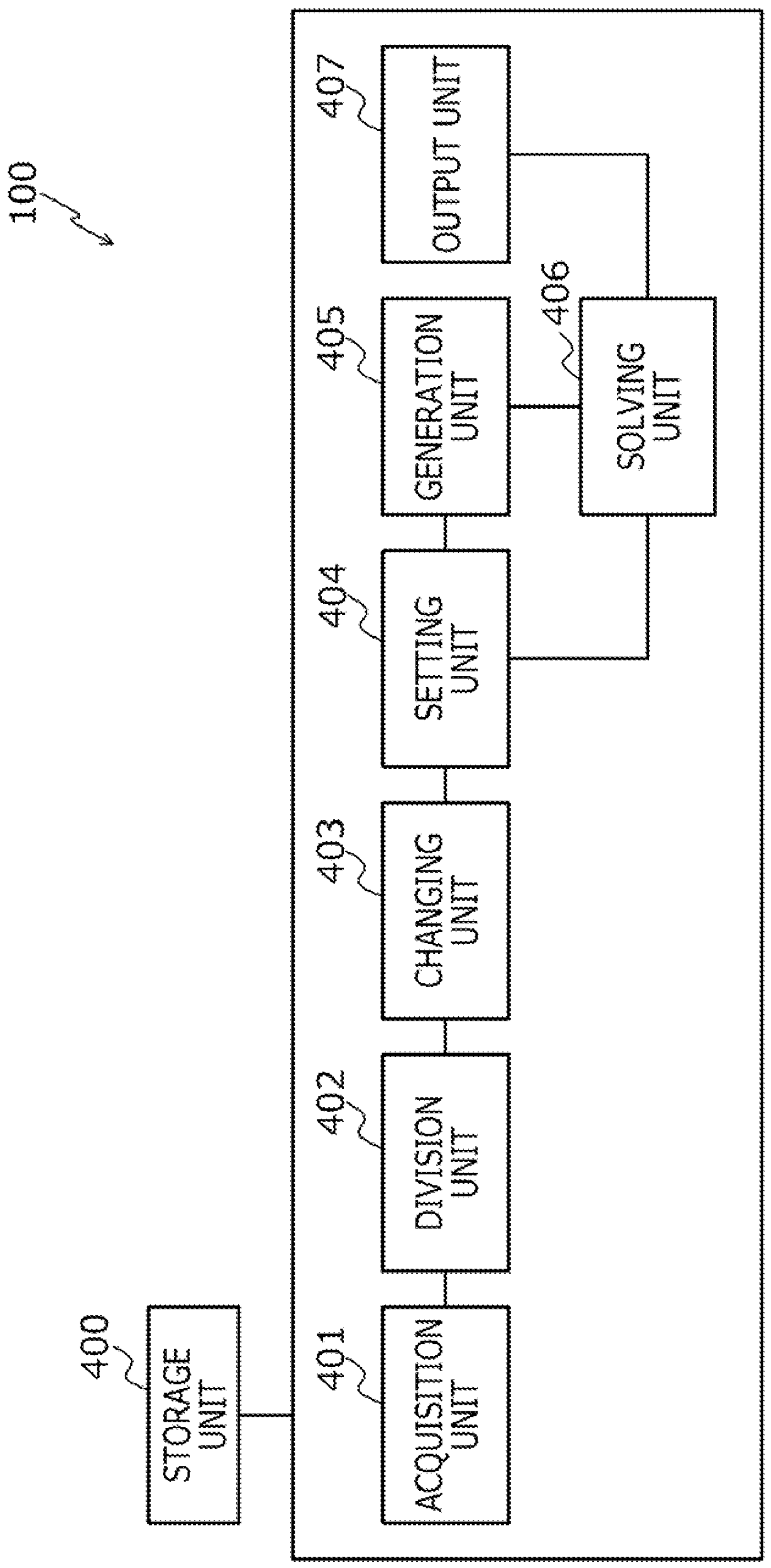
FIG. 4 is a block diagram illustrating a functional configuration example of the information processing apparatus.

FIG. 4 is a block diagram illustrating the functional configuration example of the information processing apparatus 100. The information processing apparatus 100 includes a storage unit 400, an acquisition unit 401, a division unit 402, a changing unit 403, a setting unit 404, a generation unit 405, a solving unit 406, and an output unit 407.

The storage unit 400 is implemented by, for example, a storage area such as the memory 302 or the recording medium 305 illustrated in FIG. 3. Hereinafter, a case where the storage unit 400 is included in the information processing apparatus 100 will be described, but the embodiment is not limited thereto. For example, there may be a case where the storage unit 400 is included in an apparatus different from the information processing apparatus 100 and the information processing apparatus 100 is capable of referring to the stored contents of the storage unit 400.

The acquisition unit 401 to the output unit 407 function as an example of a control unit. For example, functions of the acquisition unit 401 to the output unit 407 are implemented by causing the CPU 301 to execute a program stored in a storage area such as the memory 302 or the recording medium 305 illustrated in FIG. 3 or by using the network I/F 303. A result of the process performed by each functional unit is stored in the storage area such as the memory 302 or the recording medium 305 illustrated in FIG. 3, for example.

The storage unit 400 stores various types of information to be referred to or updated in the processing of each functional unit. The storage unit 400 stores a machine learning model that performs a matrix operation. The machine learning model is, for example, a neural network. The machine learning model is updated, for example, by the generation unit 405. The storage unit 400 stores, for example, parameters of the machine learning model.

The storage unit 400 stores a matrix forming a matrix equation being a target to be inputted to the machine learning model. The target to be inputted is a matrix to be inputted to the machine learning model when, for example, the machine learning model is to be updated and is included in a training data set for the machine learning model. For example, the target to be inputted may be a matrix to be inputted to the machine learning model when a solution to the matrix equation is to be acquired by solving the matrix equation using the machine learning model.

The matrix is, for example, at least one matrix of a first matrix representing a coefficient of the matrix equation, a second matrix representing a solution to the matrix equation, and a third matrix representing a product of the first matrix and the second matrix. The first matrix is, for example, a coefficient matrix A. The second matrix is, for example, a solution vector x. The third matrix is, for example, a right-side vector b.

The acquisition unit 401 acquires various kinds of information for use in processing performed by the individual functional units. The acquisition unit 401 stores the acquired various kinds of information in the storage unit 400 or outputs the acquired various kinds of information to the individual functional units. The acquisition unit 401 may output the various kinds of information stored in the storage unit 400 to the individual functional units. For example, the acquisition unit 401 acquires various kinds of information based on an operation input by a user. For example, the acquisition unit 401 may receive the various kinds of information from an apparatus different from the information processing apparatus 100.

The acquisition unit 401 acquires, for example, a matrix forming a predetermined matrix equation. The matrix is, for example, at least one matrix of a first matrix representing a coefficient of the predetermined matrix equation, a second matrix representing a solution to the predetermined matrix equation, and a third matrix representing a product of the first matrix and the second matrix. The first matrix is, for example, a coefficient matrix A. The second matrix is, for example, a solution vector x. The third matrix is, for example, a right-side vector b.

The predetermined matrix equation is, for example, a matrix equation to be solved by the iterative solution technique. The predetermined matrix equation may be, for example, a matrix equation including a pre-processing matrix to be used for pre-processing including changing an eigenvalue distribution of any matrix equation in the iterative solution technique. The acquisition unit 401, for example, uses a machine learning model to acquire a matrix forming a predetermined matrix equation for acquiring a solution to the predetermined matrix equation. The acquisition unit 401 acquires, for example, a matrix forming a predetermined matrix equation to be used for updating a machine learning model.

For example, the acquisition unit 401 acquires a first matrix representing a coefficient of the predetermined matrix equation. The acquisition unit 401 acquires, for example, a third matrix representing a product of the first matrix representing a coefficient of a predetermined matrix equation and a second matrix representing a solution to the predetermined matrix equation. The acquisition unit 401 acquires, for example, a coefficient matrix A and a right-side vector b. The acquisition unit 401 may acquire, for example, the second matrix representing a solution to the predetermined matrix equation. The acquisition unit 401 acquires, for example, a solution vector x.

For example, a case may be considered in which a plurality of simulations that respectively solve different matrix equations of an identical type, which are different from each other, by the iterative solution technique is to be executed. In this case, for example, every time a simulation is to be executed, the acquisition unit 401 may acquire a matrix forming a matrix equation to be solved by the iterative solution technique when the simulation is executed. For example, every time the simulation is to be executed, the acquisition unit 401 may acquire a matrix forming a matrix equation including a pre-processing matrix to be used for pre-processing including changing an eigenvalue distribution of any matrix equation in the iterative solution technique when the simulation is executed.

The acquisition unit 401 may accept a start trigger for starting processing performed by any of the functional units. The start trigger is, for example, a predetermined operation input by a user. The start trigger may be, for example, receipt of predetermined information from another computer. The start trigger may be, for example, output of predetermined information by any of the functional units. The acquisition unit 401 may accept, for example, acquisition of a matrix as the start trigger for starting processing to be performed by the division unit 402 to the solving unit 406.

Based on an attribute of each element of a plurality of elements included in the acquired matrix, the division unit 402 divides the acquired matrix into a plurality of blocks each including elements having an identical attribute. The attribute is, for example, information indicating what kind of physical amount the element has. The attribute may be a magnitude of the order of the element. The division unit 402 divides, for example, the coefficient matrix A into a block A1 and a block A2 and divides the right-side vector b into a block b1 and a block b2. The division unit 402 may divide, for example, the solution matrix x into a block x1 and a block x2. Thus, the division unit 402 may identify parts having different properties in the acquired matrix.

The first matrix and the third matrix may be acquired. In this case, for the acquired matrices, the division unit 402 may identify a fourth matrix representing a cardinal number forming each element when a plurality of elements included in the matrices is represented by a floating point number and a fifth matrix representing an index forming each element when the plurality of elements included in the same matrices is represented by a floating point number. Thus, the division unit 402 may identify the fourth matrix and the fifth matrix in which the scales are matched among the elements corresponding to the acquired matrices.

The changing unit 403 changes the scale of each element of the plurality of elements included in each block of the plurality of divided blocks. For example, based on the size of at least one element included in each block of the plurality of divided blocks, the changing unit 403 changes the scale of each element included in the plurality of elements included in the block.

The first matrix and the third matrix may be acquired. In this case, for example, the changing unit 403 calculates a scaling factor acquired by multiplying an inverse of any element having a maximum absolute value by a predetermined value, in each of the blocks. This predetermined value may be uniformly changed by convergence of learning. For example, the changing unit 403 changes the scale of each element of the plurality of elements included in each block by multiplying each element of the plurality of elements included in the block by the scaling factor calculated for the block.

For example, the changing unit 403 sets a scaling factor $\alpha$ based on the size of at least one element included in the block A1 and the block b1. For example, by multiplying the block A1 and the block b1 by the set scaling factor $\alpha$, the changing unit 403 changes the scales of the block A1 and the block b1. For example, the changing unit 403 sets a scaling factor $\beta$based on the size of at least one element included in the block A2 and the block b2. For example, by multiplying the block A2 and the block b2 by the set scaling factor $\beta$, the changing unit 403 changes the scales of the block A2 and the block b2. Thus, the changing unit 403 may cause the scales of the elements included in the acquired matrices to be matched.

The second matrix may be acquired. In this case, for example, based on a predetermined function set for each block, the changing unit 403 changes the scale of each element of the plurality of elements included in the block by converting each element of the plurality of elements included in the block. The predetermined function is set in advance by a user, for example.

For example, based on a predetermined function set for the block x1, the changing unit 403 changes the scale of the block x1 by converting each element of the plurality of elements included in the block x1. For example, based on a predetermined function set for the block x2, the changing unit 403 changes the scale of the block x2 by converting each element of the plurality of elements included in the block x2. Thus, the changing unit 403 may cause the scales of the elements included in the acquired matrices to be matched.

The setting unit 404 sets the matrix after the scale of each element of a plurality of elements included in each block is changed to a target to be inputted to a machine learning model. For example, a case may be considered where the acquisition unit 401 has acquired a matrix for acquiring a solution to a predetermined matrix equation. In this case, the setting unit 404 sets, for example, a matrix after the scale of each element of a plurality of elements included in each block is changed as a target to be inputted to a machine learning model for acquiring a solution to a predetermined matrix equation. Thus, the setting unit 404 may enable a solution to the predetermined matrix equation to be calculated.

For example, a case may be considered where the acquisition unit 401 has acquired a matrix for updating a machine learning model. In this case, the setting unit 404 sets, for example, the matrix after the scale of each element of a plurality of elements included in each of blocks is changed to a target to be inputted to the machine learning model for updating the machine learning model. Thus, the setting unit 404 may cause the machine learning model to be able to be updated.

For the acquired matrix, the setting unit 404 may set the identified fourth matrix and the identified fifth matrix to a target to be inputted to the machine learning model. For example, a case may be considered where the acquisition unit 401 has acquired a matrix for acquiring a solution to a predetermined matrix equation. In this case, for the acquired matrix, for example, the setting unit 404 sets the identified fourth matrix and the identified fifth matrix to a target to be inputted to the machine learning model for acquiring a solution to the predetermined matrix equation. Thus, the setting unit 404 may enable a solution to the predetermined matrix equation to be calculated.

For example, a case may be considered where the acquisition unit 401 has acquired a matrix for updating a machine learning model. In this case, for the acquired matrix, for example, the setting unit 404 sets the identified fourth matrix and the identified fifth matrix to a target to be inputted to the machine learning model for updating the machine learning model. Thus, the setting unit 404 may cause the machine learning model to be able to be updated.

When the predetermined matrix equation is a matrix equation to be solved by the iterative solution technique, the setting unit 404 may set the target to be inputted before the predetermined matrix equation is solved by the iterative solution technique. Thus, as an initial value for the iterative solution technique, the setting unit 404 may enable a solution to the predetermined matrix equation to be calculated.

When the predetermined matrix equation is a matrix equation to be solved by the iterative solution technique, the setting unit 404 may set the target to be inputted after the predetermined matrix equation is solved by the iterative solution technique. Thus, the setting unit 404 may enable the machine learning model to be updated based on a result of actually solving the predetermined matrix equation by the iterative solution technique.

When the predetermined matrix equation is a matrix equation including a pre-processing matrix to be used for pre-processing including changing an eigenvalue distribution of any matrix equation in the iterative solution technique, the setting unit 404 may set the target to be inputted before the pre-processing is performed in the iterative solution technique. Thus, the setting unit 404 may enable a solution to the predetermined matrix equation to be calculated in the pre-processing.

When the predetermined matrix equation is a matrix equation including a pre-processing matrix to be used for pre-processing including changing an eigenvalue distribution of any matrix equation in the iterative solution technique, the setting unit 404 may set the target to be inputted after the pre-processing is performed in the iterative solution technique. Thus, the setting unit 404 may enable the machine learning model to be updated based on a result of actually solving the predetermined matrix equation in the pre-processing.

The generation unit 405 updates the machine learning model. For example, a case may be considered where the predetermined matrix equation is a matrix equation to be solved by the iterative solution technique. In this case, the generation unit 405 updates the machine learning model based on the set target to be inputted after, for example, the predetermined matrix equation is solved by the iterative solution technique. For example, the generation unit 405 updates the machine learning model based on the set target to be inputted by using a method such as error backpropagation. Thus, the generation unit 405 may acquire a machine learning model having relatively high solving precision.

For example, a case may be considered where the predetermined matrix equation is a matrix equation including a pre-processing matrix to be used for pre-processing including changing an eigenvalue distribution of any matrix equation in the iterative solution technique. In this case, the generation unit 405 updates the machine learning model based on the set target to be inputted after, for example, the pre-processing is executed in the iterative solution technique. For example, the generation unit 405 updates the machine learning model based on the set target to be inputted by using a method such as error backpropagation. Thus, the generation unit 405 may acquire a machine learning model having relatively high solving precision.

The generation unit 405 may check the solving precision of the machine learning model, for example. The solving precision is represented by, for example, the smallness of the residual of the machine learning model. The generation unit 405 may update the machine learning model based on the set target to be inputted when, for example, it is determined that the solving precision of the machine learning model is less than a threshold value. For example, when the residual of the machine learning model is greater than or equal to a threshold value, the generation unit 405 may determine that the solving precision of the machine learning model is less than the threshold value and update the machine learning model based on the set target to be inputted.

When, for example, it is determined that the solving precision of the machine learning model is greater than or equal to the threshold value, the generation unit 405 may exit without updating the machine learning model based on the set target to be inputted. For example, when the residual of the machine learning model is less than the threshold value, the generation unit 405 may determine that the solving precision of the machine learning model is greater than or equal to the threshold value and exit without updating the machine learning model based on the set target to be inputted. Thus, the generation unit 405 may exit without updating the machine learning model when the solving precision of the machine learning model is relatively high and attempt reduction of the amount of processing.

Like the generation unit 405, there may be a case where the acquisition unit 401, the division unit 402 and the changing unit 403 attempt reduction of the amount of processing based on the solving precision of the machine learning model. The generation unit 405 may update the machine learning model based on a new target to be inputted acquired by adding a perturbation matrix to the set target to be inputted. Thus, the generation unit 405 may improve the solving precision of the machine learning model.

The solving unit 406 solves the predetermined matrix equation and calculates a solution to the predetermined matrix equation. For example, a case may be considered where the predetermined matrix equation is a matrix equation to be solved by the iterative solution technique. In this case, the solving unit 406 inputs the target to be inputted to the machine learning model, for example, before the predetermined matrix equation is solved by the iterative solution technique. The solving unit 406 acquires the second matrix outputted from the machine learning model in accordance with the input and sets it to an initial value to be used for solving the predetermined matrix equation by the iterative solution technique. The solving unit 406 may solve the predetermined matrix equation by the iterative solution technique based on the set initial value. Thus, the solving unit 406 may attempt improvement of the precision for solving the predetermined matrix equation.

For example, a case may be considered where the predetermined matrix equation is a matrix equation including a pre-processing matrix to be used for pre-processing including changing an eigenvalue distribution of any matrix equation in the iterative solution technique. In this case, for example, the solving unit 406 inputs the set target to be inputted to the machine learning model before the pre-processing is executed in the iterative solution technique. The solving unit 406 executes the pre-processing based on the second matrix outputted from the machine learning model in accordance with the input. Consequently, the solving unit 406 may attempt reduction of the amount of processing on the pre-processing.

The output unit 407 outputs a processing result acquired by any of the functional units. For example, the output is made in the form of display on a display, print output to a printer, transmission to an external apparatus through the network I/F 303, or storage in a storage area such as the memory 302 or the recording medium 305. Thus, the output unit 407 allows a user to be notified of the processing result of each of the functional units and may attempt improvement of convenience of the information processing apparatus 100.

The output unit 407 outputs, for example, the machine learning model. Thus, the output unit 407 may make the machine learning model having relatively high solving precision available to a user, an external apparatus or the like. The output unit 407 outputs, for example, a solution to the predetermined matrix equation. Thus, the output unit 407 may make the solution to the predetermined matrix equation available to a user, an external apparatus or the like.

(First Operational Example of Information Processing Apparatus 100)

Next, a first operational example of the information processing apparatus 100 will be described with reference to FIGS. 5 to 11.

FIGS. 5 to 11 are explanatory diagrams illustrating a first operational example of the information processing apparatus 100. Referring to FIGS. 5 to 11, the information processing apparatus 100 applies a machine learning model to a numerical simulation to attempt improvement of the processing speed of the numerical simulation and improvement of the solving precision. First, with reference to the illustration in FIG. 5, a flow of a numerical simulation to be executed by the information processing apparatus 100 will be described.

Figure 5:
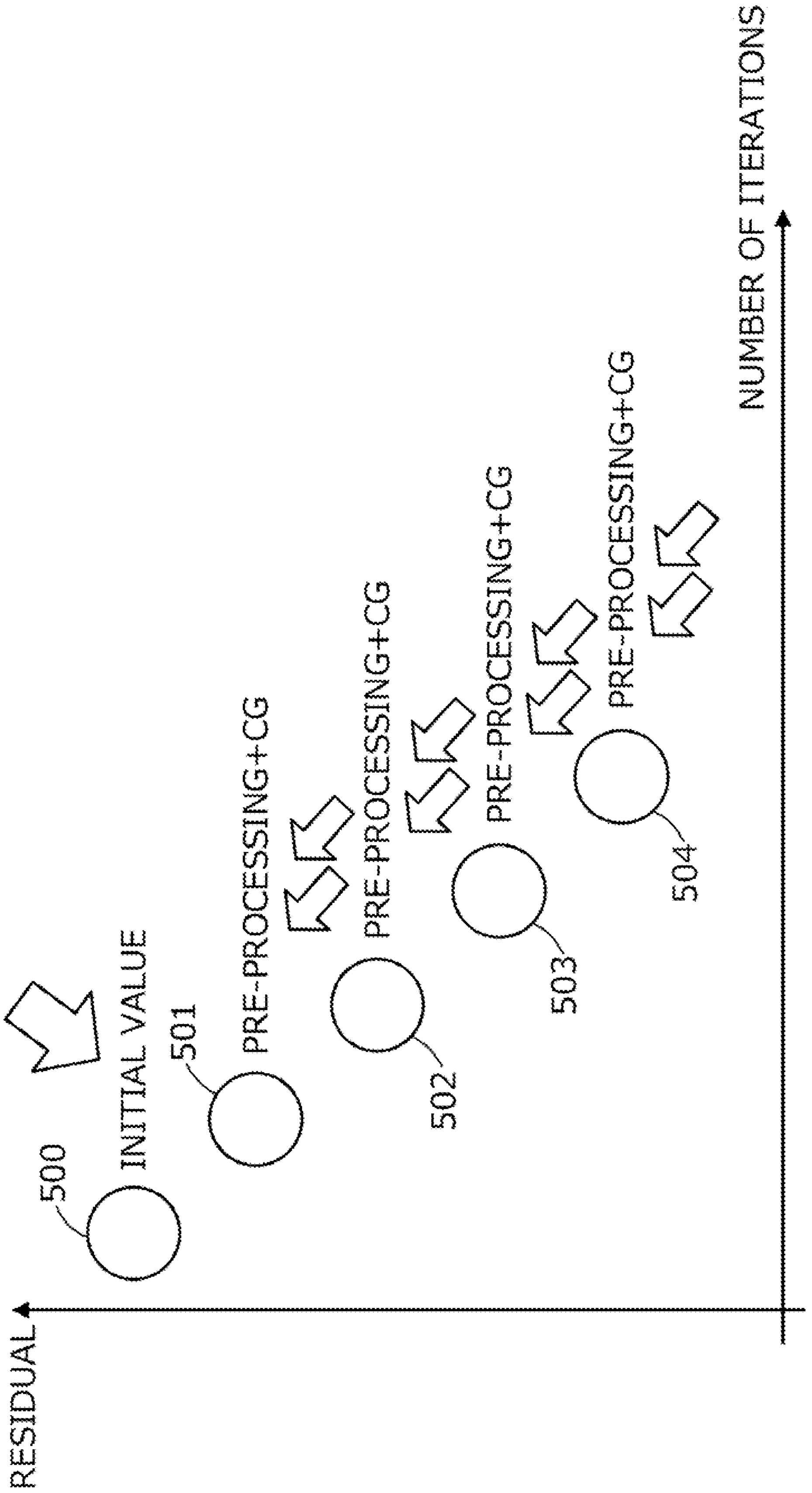
FIG. 5 is an explanatory diagram (Part 1) illustrating a first operational example of the information processing apparatus.

As illustrated in FIG. 5, the numerical simulation generates a matrix equation by linearizing a nonlinear problem and then executes the iterative solution technique to solve the matrix equation. Before the iterative solution technique is executed, an initial value 500 is set as the solution to the matrix equation. In the iterative solution technique, the solution to the matrix equation is converged toward the true solution from the initial value 500 every iteration.

For example, in the iterative solution technique, the solution to the matrix equation is converged sequentially from the initial value 500 to provisional solutions 501 to 504 such that the residual is reduced every iteration. In the iterative solution technique, the solution to the matrix equation is outputted as a final solution when the residual is less than a threshold value. One iteration is formed by pre-processing including changing the eigenvalue distribution of the matrix equation and numerical processing by CG method.

The pre-processing is implemented by, for example, incomplete LU(k) factorization (iLU(k) factorization). iLU factorization is a method that calculates $x=U^{(-1)}L^{(-1)}r$ by performing incomplete LU factorization by on a sparse matrix A by using, for example, a nonzero structure of $A^k$ taking account for fill-ins up to fill-in level k so that LUx=r is calculated. It is assumed that (−1) at the right shoulder of the matrix represents an inverse matrix. In solving by numerical analysis method, iLU factorization easily increases the processing time due to determination of a nonzero structure, computation of matrix decomposition, and forward substitution and backward elimination. CG method may be replaced by GMRES method, for example.

The information processing apparatus 100 applies the machine learning model to a numerical simulation to attempt improvement of the processing speed of the numerical simulation and improvement of the solving precision. For example, it may be considered that, when the initial value 500 is set to the solution to the matrix equation, the information processing apparatus 100 performs a first operation including applying the machine learning model to attempt reduction of the number of iterations to be performed until the final solution is reached. The first operational example is an operational example corresponding to a case where the information processing apparatus 100 performs the first operation.

The case where the information processing apparatus 100 performs the first operation has been described here, but the embodiment is not limited thereto. For example, there may be a case where the information processing apparatus 100 performs a second operation including applying the machine learning model in performing the pre-processing to attempt reduction of the processing time for the pre-processing and thus attempt improvement of the processing speed of a numerical simulation and improvement of the solving precision. A second operational example corresponding to a case where the information processing apparatus 100 performs the second operation will be described below with reference to, for example, FIGS. 15 to 18.

Figure 6:
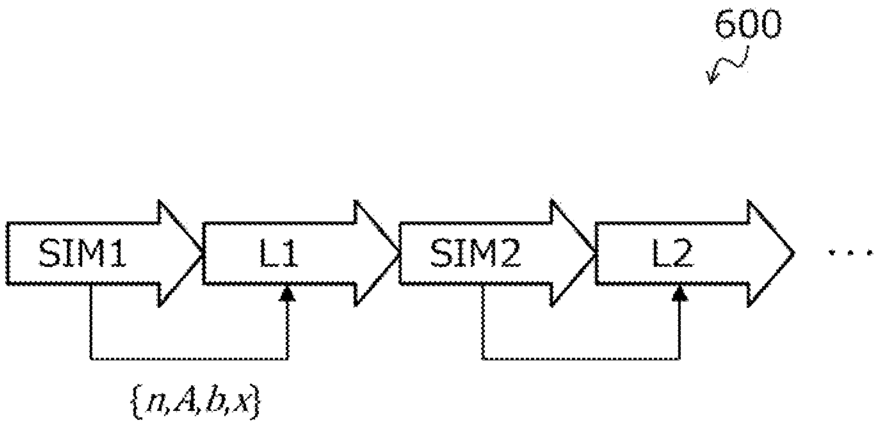
FIG. 6 is an explanatory diagram (Part 2) illustrating the first operational example of the information processing apparatus.
Figure 7:
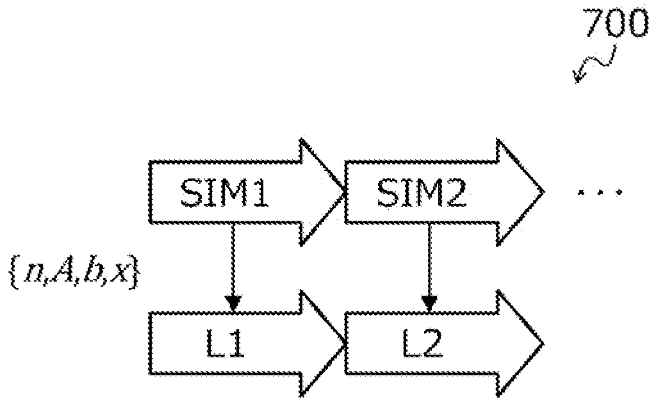
FIG. 7 is an explanatory diagram (Part 3) illustrating the first operational example of the information processing apparatus.
Figure 8:
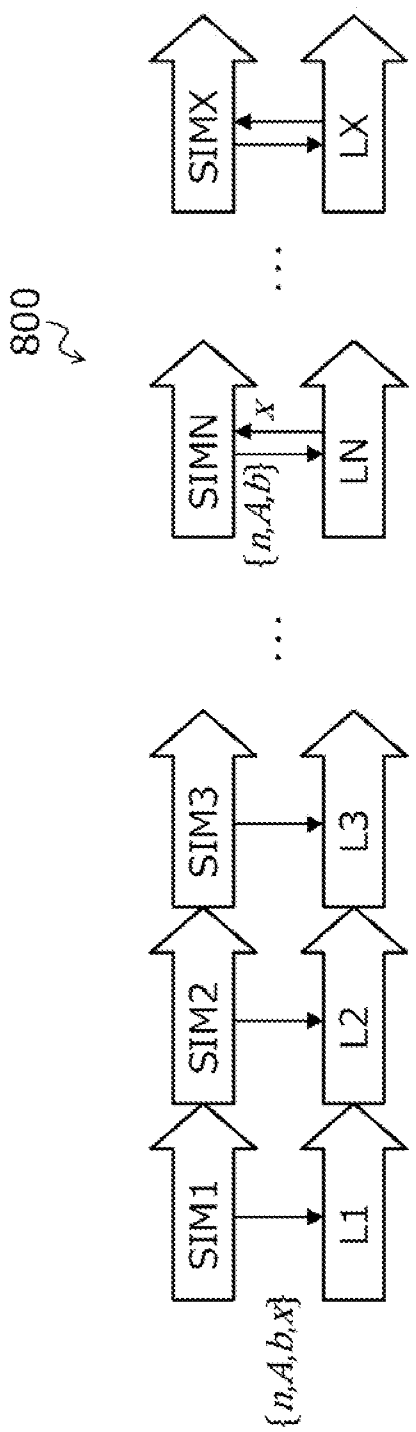
FIG. 8 is an explanatory diagram (Part 4) illustrating the first operational example of the information processing apparatus.

A numerical simulation is sometimes repeatedly performed. With reference to FIGS. 6 to 8, how the information processing apparatus 100 applies a machine learning model to whole processing of repeating a numerical simulation when the numerical simulation is repeatedly executed will be described. First, referring to FIG. 6, an example where the information processing apparatus 100 updates the machine learning model will be described.

For example, as illustrated in a reference drawing 600 in FIG. 6, it may be considered that the information processing apparatus 100 alternately and repeatedly performs a numerical simulation SIMi and a machine learning process Li of updating the machine learning model based on a result of the numerical simulation SIMi. i is a natural number. One machine learning model is sequentially updated in each machine learning process Li and is sequentially used in each numerical simulation SIMi.

The machine learning process Li updates the machine learning model based on a training data set {n,A,b,x} including the magnitude n of the coefficient matrix A, the coefficient matrix A, the right-side vector b and the solution vector x, which are acquired as a result of the numerical simulation SIMi. For example, the training data set includes the coefficient matrix A, the right-side vector b and the solution vector x forming the matrix equation solved in a multiple loop of time evolution and NR method in the numerical simulation SIMi.

The training data set may be set to the target to be inputted to the machine learning model after adjusting the scales to be matched among the elements, for example, in updating the machine learning model. A specific example where the training data set is set to the target to be inputted to the machine learning model after adjusting the scales to be matched among the elements will be described below with reference to, for example, FIGS. 20 to 24.

Thus, the information processing apparatus 100 may update the machine learning model through a plurality of numerical simulations SIMi which tend to solve matrix equations expressing similar problems so that the machine learning model may be updated efficiently. Thus, the information processing apparatus 100 may achieve higher solving precision of the machine learning model as more numerical simulations SIMi are executed.

The machine learning process Li may calculate b' by adding a perturbation Δb to the right-side vector b based on the training data set {n,A,b,x}, calculate $x'=A^{(-1)}b'$, and thus generate a new training data set {n,A,b',x'}. Thus, in the machine learning process Li, the information processing apparatus 100 increases the number of training data so that the machine learning model may be updated more easily to improve the solving precision.

The machine learning process Li may update in parallel a plurality of machine learning models having different parameters from each other. Thus, the information processing apparatus 100 may allow the machine learning model having relatively high solving precision to be utilized selectively among a plurality of machine learning models. Next, referring to FIG. 7, another example where the information processing apparatus 100 updates the machine learning model will be described.

For example, as illustrated in a reference drawing 700 in FIG. 7, it may be considered that the information processing apparatus 100 in parallel and repeatedly performs a numerical simulation SIMi and a machine learning process Li of updating the machine learning model based on a result of the numerical simulation SIMi. Next, referring to FIG. 8, an example where the information processing apparatus 100 utilizes the machine learning model will be described.

For example, as illustrated in a reference drawing 800 in FIG. 8, it may be considered that the information processing apparatus 100 is configured not to update the machine learning model in the machine learning process Li (i≥N) after any numerical simulation SIMN.

The information processing apparatus 100 is configured not to update the machine learning model in the machine learning process Li (i≥N) when, for example, the solving precision of the machine learning model is greater than or equal to predetermined precision at the numerical simulation SIMN For example, the numerical simulation SIMi (i<N) causes the machine learning process Li (i<N) to calculate an initial value for the iterative solution technique by transmitting an input data set {n,A,b) representing a matrix equation to the machine learning process Li (i<N).

The input data set may be transmitted to the machine learning process Li (i<N) after, for example, adjusting the scales to be matched among the elements and may be set to the target to be inputted to the machine learning model. A specific example where the input data set is set to the target to be inputted to the machine learning model after adjusting the scales to be matched among the elements will be described below with reference to, for example, FIGS. 20 to 24.

The information processing apparatus 100 calculates an index value indicating desirability of the calculated initial value for the iterative solution technique as solving precision of the machine learning model. The index value is, for example, a difference between the calculated initial value for the iterative solution technique and the solution vector x calculated by the iterative solution technique in the numerical simulation SIMi (i<N). The information processing apparatus 100 is configured not to update the machine learning model in a machine learning process Li (i≥N) after, for example, the solving precision of the machine learning model gets greater than or equal to predetermined precision.

Thereafter, the numerical simulation SIMi (i≥N) transmits the input data set {n,A,b} representing a matrix equation to the machine learning process Li (i≥N). The machine learning process Li (i≥N) inputs the received input data set {n,A,b} to the machine learning model and transmits the solution vector x acquired by the machine learning model as a result of the input to the numerical simulation SIMi (i≥N).

The input data set may be transmitted to the machine learning process Li (i<N) after, for example, adjusting the scales to be matched among the elements and may be set to the target to be inputted to the machine learning model. A specific example where the input data set is set to the target to be inputted to the machine learning model after adjusting the scales to be matched among the elements will be described below with reference to, for example, FIGS. 20 to 24.

The numerical simulation SIMi (i≥n) sets the received solution vector x to the matrix equation to an initial value for the iterative solution technique and calculates a final solution vector x to the matrix equation by the iterative solution technique.

Thus, the information processing apparatus 100 may enable the numerical simulation SIMi to solve the matrix equation by using the machine learning model having relatively high solving precision if any so that reduction of the amount of processing in the numerical simulation SIMi may be attempted. Thus, the information processing apparatus 100 may attempt improvement of the processing speed of the numerical simulation SIMi and improvement of the solving precision.

The information processing apparatus 100 may attempt reduction of the amount of processing involved in the numerical simulation SIMi (i≥N). Thus, the information processing apparatus 100 may cancel increases of the amount of processing due to the updates of the machine learning model in the machine learning process Li (i<N). As a result, the information processing apparatus 100 may attempt further reduction of the amount of processing all over the plurality of numerical simulations SIMi as the numerical simulation SIMi is repeated more.

The information processing apparatus 100 may try a method that solves a matrix equation by using the machine learning model in the initial several numerical simulations SIMi and a method that solves a matrix equation without using the machine learning model and calculate the solving precision of each of the methods. The information processing apparatus 100 may solve a matrix equation according to the method having the higher solving precision in the subsequent numerical simulations SIMi.

There may be a case where the information processing apparatus 100 may determine whether the machine learning model is not to be updated in the machine learning process Li in the middle of the numerical simulation SIMi. Next, effects acquired by the information processing apparatus 100 will be described with reference to FIGS. 9 to 11. First, the description continues with reference to FIG. 9.

Figure 9:
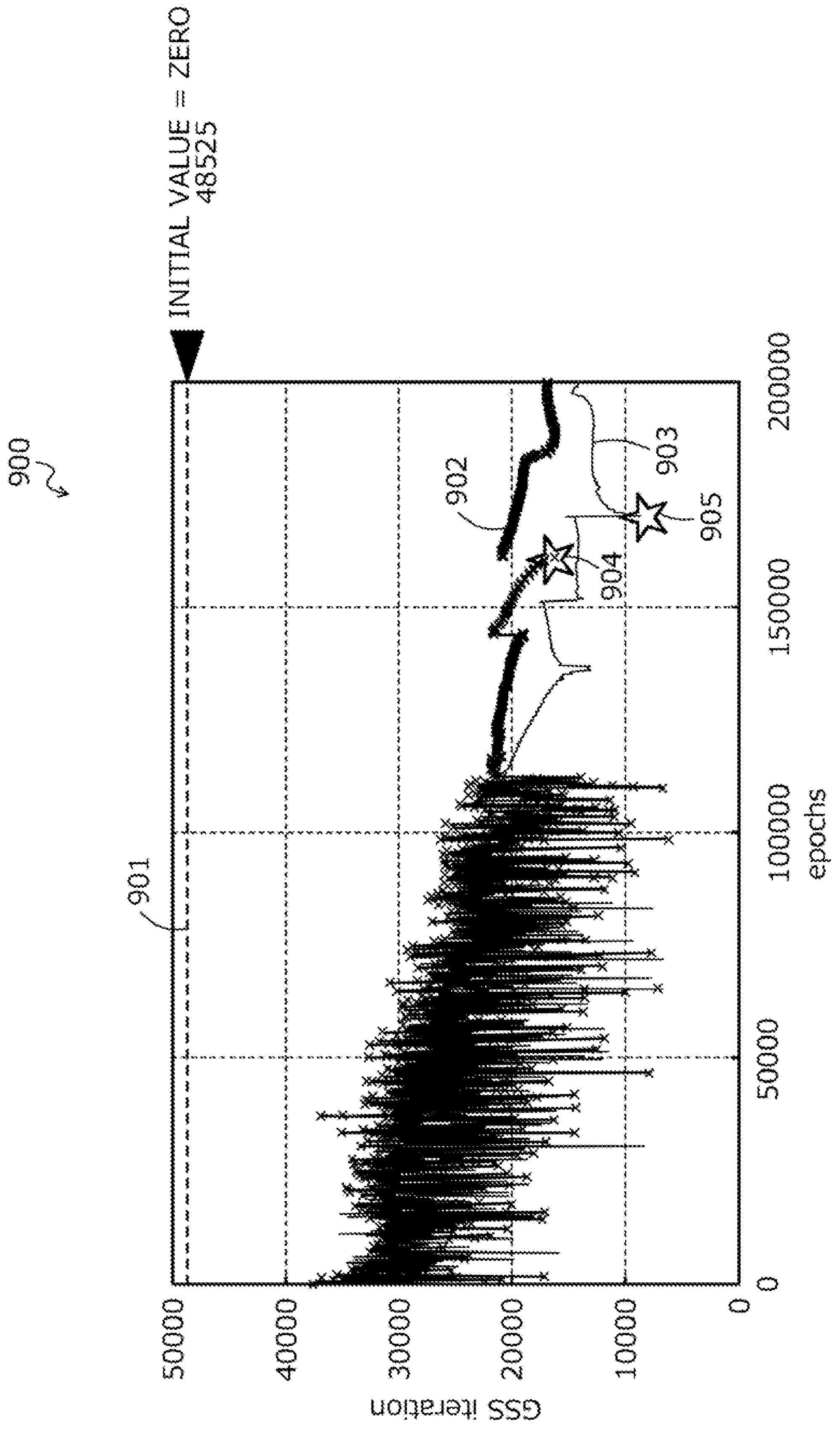
FIG. 9 is an explanatory diagram (Part 5) illustrating the first operational example of the information processing apparatus.

Referring to FIG. 9, it is assumed that the information processing apparatus 100 has solved a one-dimensional Poisson's equation representing a certain problem with a numerical simulation. In this case, it is assumed that the information processing apparatus 100 has used a convergence condition of $\|b-Ax\|<\varepsilon\|b\|$. Here, $\varepsilon=1.0\times10^{-6}$. It is assumed that the information processing apparatus 100 has increased the number of training data sets by adding a perturbation to b. The machine learning model is a neural network including an input layer of 128 nodes, a hidden layer of 1000 nodes, and an output layer of 128 nodes.

FIG. 9 illustrates a graph 900 which is a graph representing changes in the number of GSS (Gauss-Seidel Solver) iterations when an initial estimate provided by machine learning with different numbers of epochs in a case where a one-dimensional Poisson's equation representing a certain problem is solved. The number of epochs corresponds to the number of used training data sets. The number of GSS iterations corresponds to the number of iterations in the iterative solution technique. A line 901 indicates a property of a numerical simulation in the past with an initial value of 0 at all times. As indicated by the line 901, the GSS repeats steps of its iteration 48525 times for solving a one-dimensional Poisson's equation, which lowers the processing speed.

Lines 902 and 903 indicate properties provided when the information processing apparatus 100 solves a one-dimensional Poisson's equation representing a certain problem with different parameters by using the machine learning model. As indicated by the lines 902 and 903, the information processing apparatus 100 may suppress the number of iterations of the steps of the Gauss-Seidel iterative solution technique to about 38000 times even when the machine learning model having an initial state is used.

The information processing apparatus 100 may suppress the number of iterations of the steps of the iterative solution technique finally to 20000 or less after 150000 or more training data sets are used, as indicated by a point 904. The information processing apparatus 100 may suppress the number of iterations of the steps of the iterative solution technique finally to about 10000 after 150000 or more training data sets are used, as indicated by a point 905. Next, description continues with reference to FIG. 10.

Figure 10:
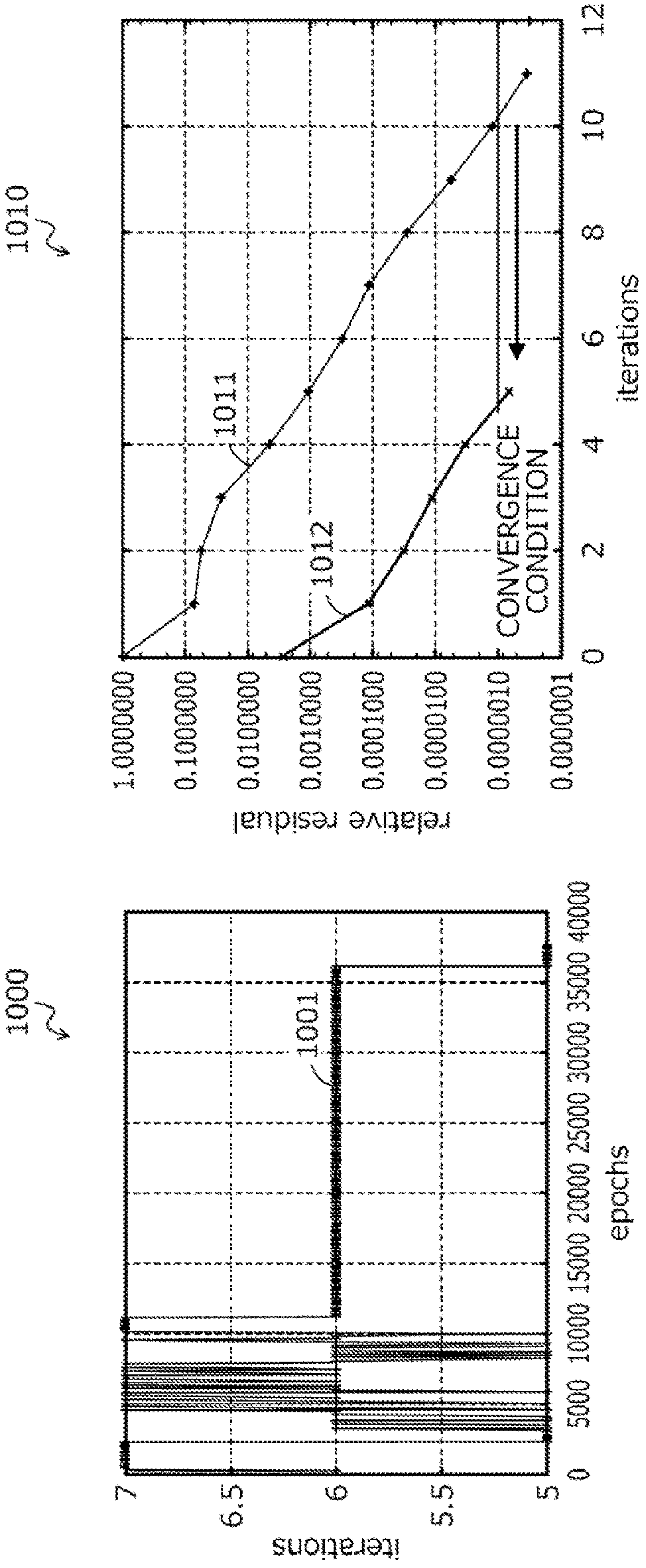
FIG. 10 is an explanatory diagram (Part 6) illustrating the first operational example of the information processing apparatus.

Referring to FIG. 10, it is assumed that the information processing apparatus 100 has solved a one-dimensional Poisson's equation representing a problem different from the one in FIG. 9 with a numerical simulation. In this case, it is assumed that the information processing apparatus 100 has used a convergence condition of $\|b-Ax\|<\varepsilon\|b\|$. Here, $\varepsilon=1.0\times 10^{-6}$. It is assumed that the information processing apparatus 100 has increased the number of training data sets by adding a perturbation to b. The machine learning model is a neural network including an input layer of 128 nodes, a hidden layer of 1000 nodes, and an output layer of 128 nodes.

FIG. 10 illustrates a graph 1000 which is a graph representing the number of iterations of CG method on an initial estimate provided by machine learning with different numbers of epochs in a case where a one-dimensional Poisson's equation representing a problem different from the one in FIG. 9 is solved. The number of epochs corresponds to the number of used training data sets. The number of iterations corresponds to the number of iterations in the iterative solution technique. A line 1001 indicates a property provided when the information processing apparatus 100 solves a one-dimensional Poisson's equation by using a machine learning model. As indicated by the line 1001, the information processing apparatus 100 may suppress the number of iterations of the steps of the iterative solution technique.

FIG. 10 illustrates a graph 1010 which is a graph representing a relative residual to the number of CG iterations in a case where a one-dimensional Poisson's equation representing a problem different from the one in FIG. 9 is solved. The number of CG iterations corresponds to the number of iterations in the iterative solution technique. The relative residual is, for example, $\|b-Ax\|/\|b\|$. A line 1011 indicates a property of a numerical simulation with an initial value of 0 at all times. As indicated by the line 1011, CG solver repeats steps of its iteration about 11 times until the convergence condition is satisfied, which lowers the processing speed.

On the other hand, a line 1012 indicates a property (relative residual to the number of CG iterations) provided when the information processing apparatus 100 solves a one-dimensional Poisson's equation representing a problem different from the one in FIG. 9 by using an initial estimate acquired by using a machine learning model. As indicated by the line 1012, the information processing apparatus 100 may reduce the number of CG iterations to the number satisfying the convergence condition and may thus attempt improvement of the processing speed. Next, description continues with reference to FIG. 11.

Figure 11:
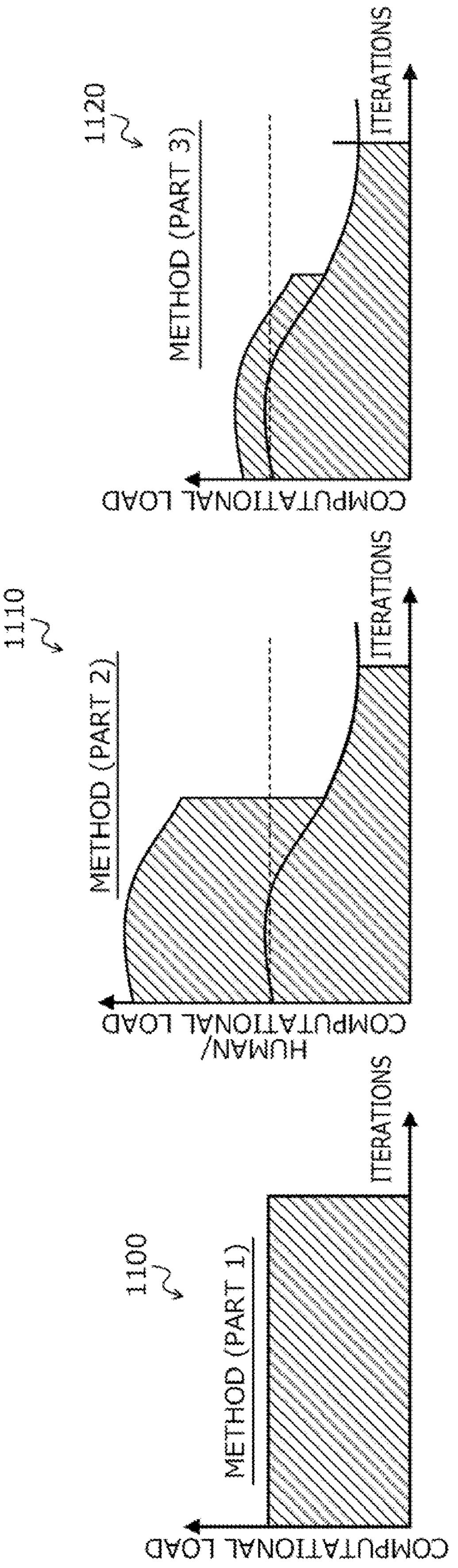
FIG. 11 is an explanatory diagram (Part 7) illustrating the first operational example of the information processing apparatus.

Referring to FIG. 11, comparisons in processing load are performed among a method in the past (Part 1), another method in the past (Part 2), and a method (Part 3) by the information processing apparatus 100. The method (Part 1) is a method without using a machine learning model. For the method (Part 2), Guo, Xiaoxiao, Wei Li, and Francesco Iorio. "Convolutional neural networks for steady flow approximation." Proceedings of the 22nd ACM SIGKDD international conference on knowledge discovery and data mining, 2016 above, for example, may be referred.

FIG. 11 illustrates a graph 1100 which is a graph representing a processing load to the number of iterations in the iterative solution technique in the method (Part 1). As indicated by the graph 1100, since the method (Part 1) imposes an equal processing load on each numerical simulation, iterations of the numerical simulations result in a totally increased processing load.

FIG. 11 further illustrates a graph 1110 which is a graph representing a processing load to the number of iterations in the iterative solution technique in the method (Part 2). Efficient execution of both of the machine learning and the numerical simulations is difficult according to the method (Part 2), which results in a large increase in processing load by the machine learning. According to the method (Part 2), human burden may be caused by machine learning.

FIG. 11 further illustrates a graph 1120 which is a graph representing a processing load to the number of iterations in the iterative solution technique in the method (Part 3). As indicated by the graph 1120, the information processing apparatus 100 may suppress an increase in processing load caused by machine learning and, at the same time, suppress an increase in total processing load in a case where a numerical simulation is repeated. The information processing apparatus 100 may suppress an increase in human burden caused by machine learning.

Figure 12:
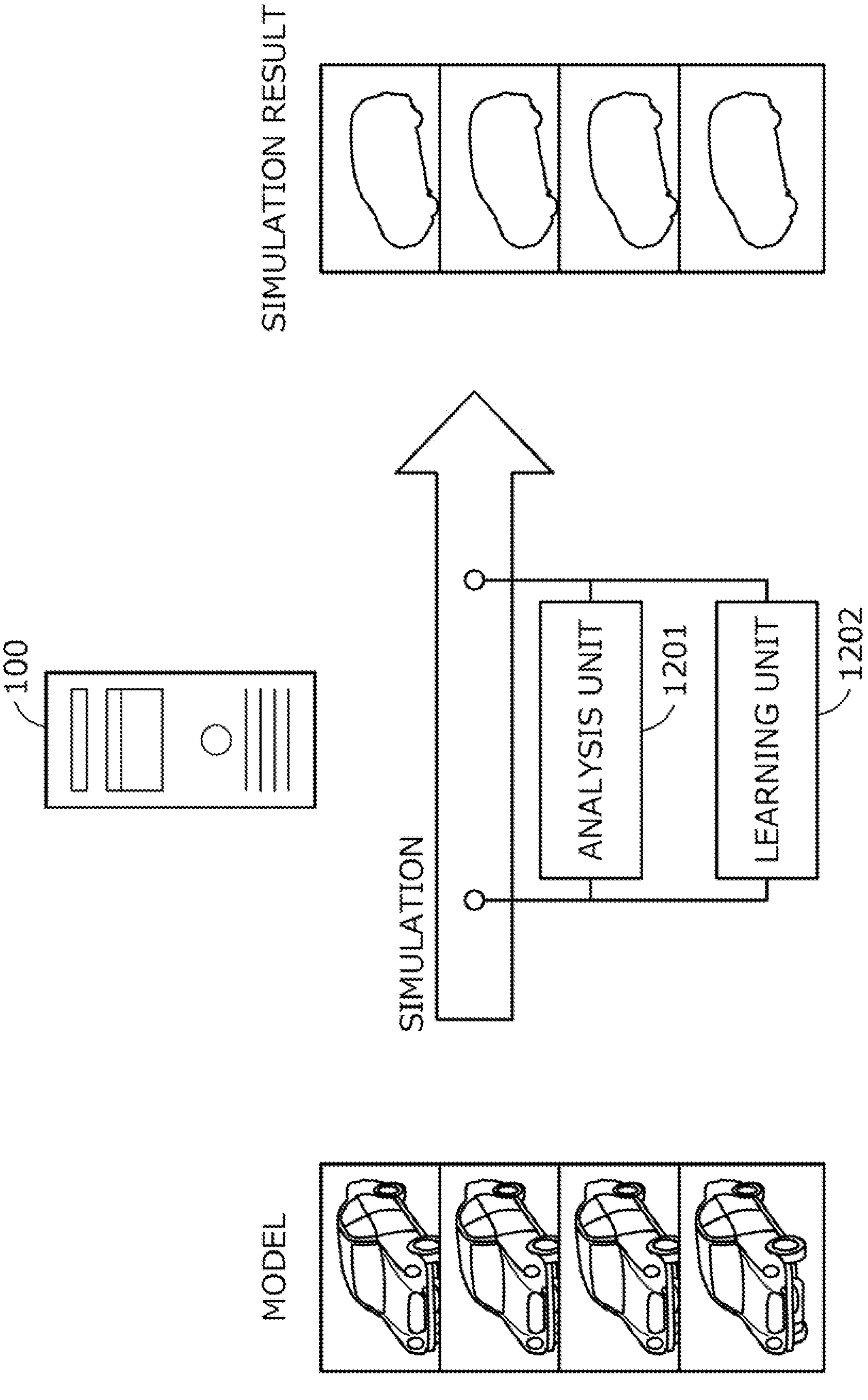
FIG. 12 is an explanatory diagram illustrating an application example of the information processing apparatus.

FIG. 12 is an explanatory diagram illustrating an application example of the information processing apparatus 100. The information processing apparatus 100 is applicable to a case where a numerical simulation that solves a matrix equation representing a problem relating to a certain product is repeated in the manufacturing domain, for example.

For example, in the manufacturing domain, the information processing apparatus 100 may update and use a machine learning model for repeating a fluid simulation that solves a matrix equation representing a problem of a fluid analysis for an automobile by sequentially changing a prerequisite therefor. For example, the information processing apparatus 100 includes an analysis unit 1201 and a learning unit 1202, in which a machine learning model is updated by the learning unit 1202 and the machine learning model is used by the analysis unit 1201.

(Overall Processing Procedure in Operational Example 1)

Figure 13:
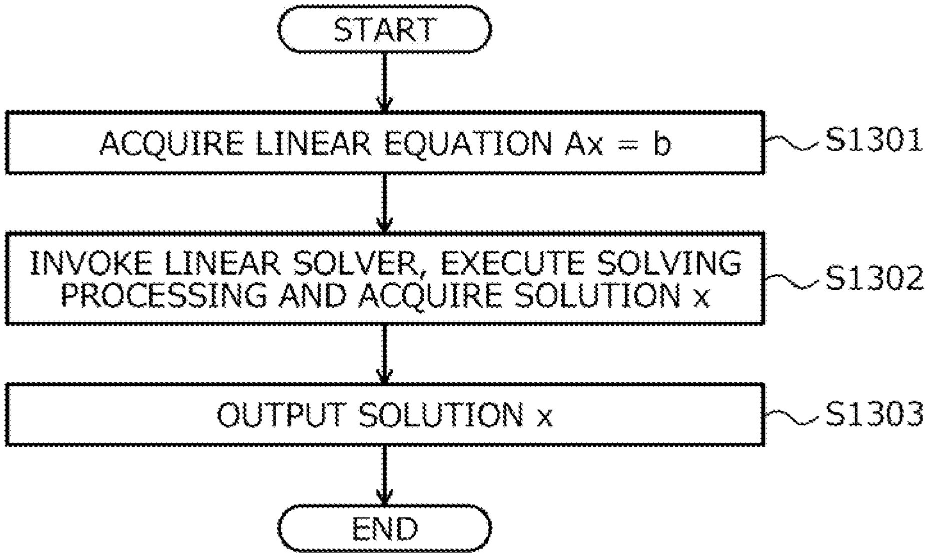
FIG. 13 is a flowchart illustrating an example of an overall processing procedure in Operational Example 1.

With reference to FIG. 13, an example of an overall processing procedure in Operational Example 1 to be executed by the information processing apparatus 100 will be described next. The overall process is implemented, for example, by the CPU 301, the storage area such as the memory 302 or the recording medium 305, and the network I/F 303 illustrated in FIG. 3.

FIG. 13 is a flowchart illustrating an example of an overall processing procedure in Operational Example 1. Referring to FIG. 13, the information processing apparatus 100 acquires a linear equation Ax=b (step S1301).

Next, the information processing apparatus 100 invokes a linear solver, executes solving processing which will be described below with reference to FIG. 14, and acquires a solution x (step S1302). The linear solver is software that executes a numerical simulation by using a machine learning model.

Next, the information processing apparatus 100 outputs the solution x to the linear equation Ax=b (step S1303). The information processing apparatus 100 ends the overall process. Thus, the information processing apparatus 100 may efficiently calculate the solution x to the linear equation Ax=b by using a machine learning model.

(Solving Processing Procedure in Operational Example 1)

Figure 14:
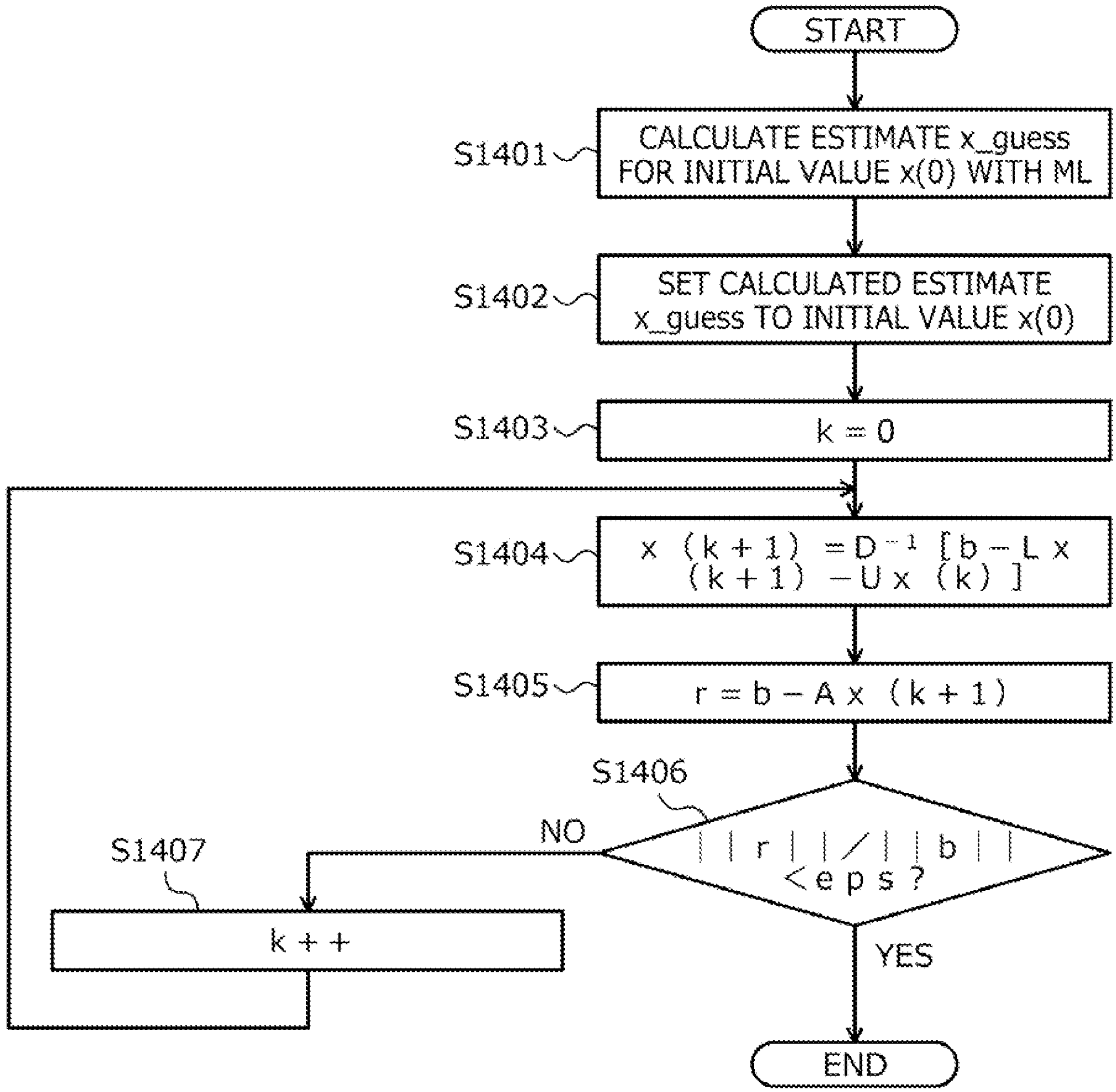
FIG. 14 is a flowchart illustrating an example of a solving processing procedure in Operational Example 1.

With reference to FIG. 14, an example of a solving processing procedure in Operational Example 1 to be executed by the information processing apparatus 100 will be described next. The solving process is implemented, for example, by the CPU 301, the storage area such as the memory 302 or the recording medium 305, and the network I/F 303 illustrated in FIG. 3.

FIG. 14 is a flowchart illustrating an example of a solving processing procedure in Operational Example 1. Referring to FIG. 14, the information processing apparatus 100 calculates an estimate x_guess for an initial value x(0) with machine learning (step S1401).

Next, the information processing apparatus 100 sets the calculated estimate x_guess to the initial value x(0) (step S1402). The information processing apparatus 100 sets k=0 (step S1403).

Next, the information processing apparatus 100 calculates $x(k+1)=D^{-1}[b-Lx(k+1)-Ux(k)]$ (step S1404). The information processing apparatus 100 calculates $r=b-Ax(k+1)$ (step S1405).

Next, the information processing apparatus 100 determines whether $\|r\|/\|b\|<eps$ is satisfied or not (step S1406). If $\|r\|/\|b\|<eps$ is not satisfied (No in step S1406), the information processing apparatus 100 increments k (step S1407) and returns to the processing in step S1404.

On the other hand, if $\|r\|/\|b\|<eps$ is satisfied (Yes in step S1406), the information processing apparatus 100 ends the solving process. Thus, the information processing apparatus 100 may acquire the solution x to the linear equation Ax=b by using a machine learning model.

(Second Operational Example of Information Processing Apparatus 100)

Next, a second operational example of the information processing apparatus 100 will be described with reference to FIGS. 15 to 18.

FIGS. 15 to 18 are explanatory diagrams illustrating the second operational example of the information processing apparatus 100. Referring to FIGS. 15 to 18, the information processing apparatus 100 applies a machine learning model to a numerical simulation to attempt improvement of the processing speed of the numerical simulation and improvement of the solving precision.

For example, the information processing apparatus 100 performs a second operation including applying the machine learning model in performing the pre-processing to attempt reduction of the processing time for the pre-processing and thus attempt improvement of the processing speed of a numerical simulation and improvement of the solving precision. The second operational example is an operational example corresponding to a case where the information processing apparatus 100 performs the second operation.

Figure 15:
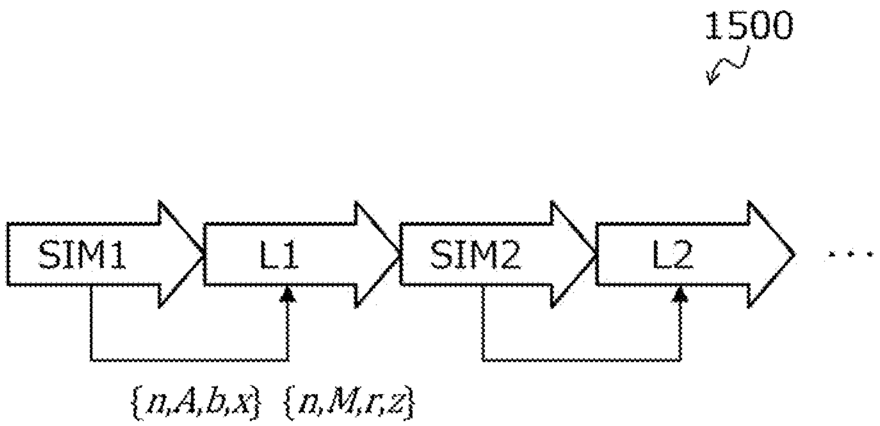
FIG. 15 is an explanatory diagram (Part 1) illustrating a second operational example of the information processing apparatus.
Figure 16:
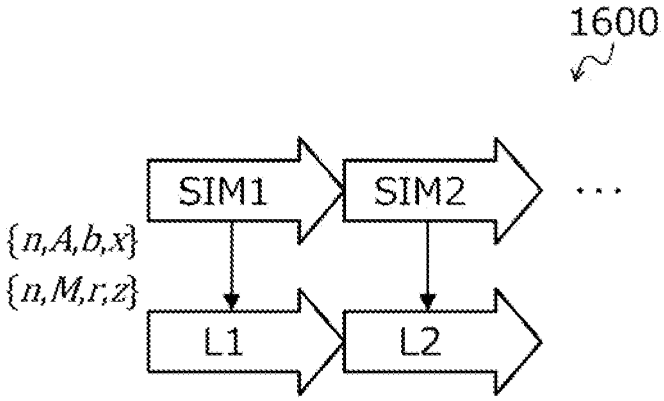
FIG. 16 is an explanatory diagram (Part 2) illustrating the second operational example of the information processing apparatus.
Figure 17:
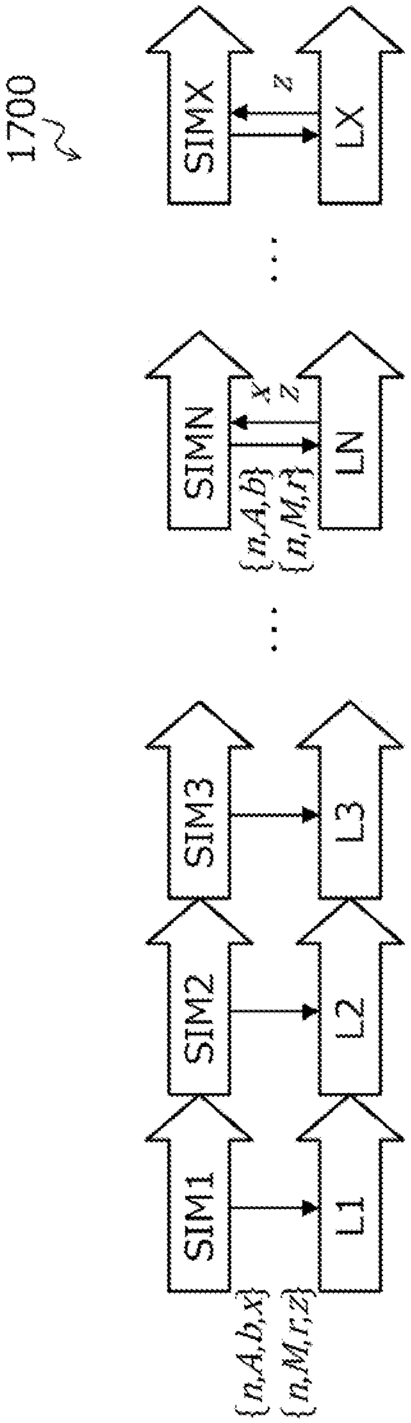
FIG. 17 is an explanatory diagram (Part 3) illustrating the second operational example of the information processing apparatus.

A numerical simulation is sometimes repeatedly performed. With reference to FIGS. 15 to 17, how the information processing apparatus 100 applies a machine learning model to whole processing of repeating a numerical simulation when the numerical simulation is repeatedly executed will be described. First, referring to FIG. 15, an example where the information processing apparatus 100 updates a machine learning model will be described.

For example, as illustrated in a reference drawing 1500 in FIG. 15, it may be considered that the information processing apparatus 100 alternately and repeatedly performs a numerical simulation SIMi and a machine learning process Li of updating a machine learning model based on a result of the numerical simulation SIMi. i is a natural number. One machine learning model is sequentially updated in each machine learning process Li and is sequentially used in each numerical simulation SIMi.

The machine learning process Li updates the machine learning model based on a training data set {n,A,b,x} including the magnitude n of the coefficient matrix A, the coefficient matrix A, the right-side vector b and the solution vector x, which are acquired as a result of the numerical simulation SIMi. For example, the training data set includes the coefficient matrix A, the right-side vector b and the solution vector x forming the matrix equation solved in a multiple loop of time evolution and NR method in the numerical simulation SIMi.

The training data set may be set to the target to be inputted to the machine learning model after adjusting the scales to be matched among the elements, for example, in updating the machine learning model. A specific example where the training data set is set to the target to be inputted to the machine learning model after adjusting the scales to be matched among the elements will be described below with reference to, for example, FIGS. 20 to 24.

Thus, the information processing apparatus 100 may update the machine learning model through a plurality of numerical simulations SIMi which tend to solve matrix equations expressing similar problems so that the machine learning model may be updated efficiently. Thus, the information processing apparatus 100 may achieve higher solving precision of the machine learning model as more numerical simulations SIMi are executed.

The machine learning process Li may calculate b' by adding a perturbation Δb to the right-side vector b based on the training data set {n,A,b,x}, calculate $x'=A^{(-1)}b'$, and thus generate a new training data set {n,A,b',x'}. Thus, in the machine learning process Li, the information processing apparatus 100 increases the number of training data so that the machine learning model may be updated more easily to improve the solving precision.

The machine learning process Li may update in parallel a plurality of machine learning models having different parameters from each other. Thus, the information processing apparatus 100 may allow the machine learning model having relatively high solving precision to be utilized selectively among a plurality of machine learning models.

The machine learning process Li may update the machine learning model based on a training data set {n,M,r,z} including a magnitude n of the coefficient matrix M, the coefficient matrix M, the right-side vector r and the solution vector z relating to LU decomposition, which are acquired as a result of the numerical simulation SIMi. Here, M=LU. $z=M^{(-1)}r$. For example, the training data set includes the coefficient matrix M, the right-side vector r and the solution vector z forming a matrix equation relating to LU decomposition, which is solved in a multiple loop of time evolution and NR method in the numerical simulation SIMi.

The training data set may be set to the target to be inputted to the machine learning model after adjusting the scales to be matched among the elements, for example, in updating the machine learning model. A specific example where the training data set is set to the target to be inputted to the machine learning model after adjusting the scales to be matched among the elements will be described below with reference to, for example, FIGS. 20 to 24.

Thus, the information processing apparatus 100 may update the machine learning model through a plurality of numerical simulations SIMi which tend to solve matrix equations expressing similar problems so that the machine learning model may be updated efficiently. Thus, the information processing apparatus 100 may achieve higher solving precision of the machine learning model as more numerical simulations SIMi are executed.

The machine learning process Li may calculate r' by adding a perturbation Δr to the right-side vector r based on the training data set {n,M,r,z}, calculate $z'=U^{(-1)}L^{(-1)}r'$, and thus generate a new training data set {n,M,r',z'}. Thus, in the machine learning process Li, the information processing apparatus 100 increases the number of training data so that the machine learning model may be updated more easily to improve the solving precision.

The machine learning process Li may update in parallel a plurality of machine learning models having different parameters from each other. Thus, the information processing apparatus 100 may allow the machine learning model having relatively high solving precision to be utilized selectively among a plurality of machine learning models. Next, referring to FIG. 16, another example where the information processing apparatus 100 updates a machine learning model will be described.

For example, as illustrated in a reference drawing 1600 in FIG. 16, it may be considered that the information processing apparatus 100 in parallel and repeatedly performs a numerical simulation SIMi and a machine learning process Li of updating a machine learning model based on a result of the numerical simulation SIMi. Next, referring to FIG. 17, an example where the information processing apparatus 100 utilizes a machine learning model will be described.

For example, as illustrated in a reference drawing 1700 in FIG. 17, it may be considered that the information processing apparatus 100 is configured not to update a machine learning model in the machine learning process Li (i≥N) after any numerical simulation SIMN.

The information processing apparatus 100 is configured not to update the machine learning model in the machine learning process Li (i≥N) when, for example, the solving precision of the machine learning model is greater than or equal to predetermined precision at the numerical simulation SIMN For example, the numerical simulation SIMi (i≤N) transmits the input data set {n,A,b} representing a matrix equation to the machine learning process Li (i≤N). As a result of the transmission, the numerical simulation SIMi (i<N) causes the machine learning process Li (i<N) to calculate the solution x to the matrix equation and calculate $z=M^{(-1)}r$ and executes the pre-processing.

The input data set may be transmitted to the machine learning process Li (i<N) after, for example, adjusting the scales to be matched among the elements and may be set to the target to be inputted to the machine learning model. A specific example where the input data set is set to the target to be inputted to the machine learning model after adjusting the scales to be matched among the elements will be described below with reference to, for example, FIGS. 20 to 24.

The information processing apparatus 100 calculates an index value indicating desirability of the calculated z as solving precision of the machine learning model. The index value is, for example, ||r||/||b||. The information processing apparatus 100 is configured not to update the machine learning model in a machine learning process Li (i≥N) after, for example, the solving precision of the machine learning model gets greater than or equal to predetermined precision.

Thereafter, the numerical simulation SIMi (i≥N) transmits the input data set {n,A,b} representing a matrix equation to the machine learning process Li (i≥N). The machine learning process Li (i≥N) inputs the received input data set {n,A,b} to the machine learning model, calculates a solution vector z based on the solution vector x acquired by the machine learning model as a result of the input, and transmits the numerical simulation SIMi (i≥N).

The input data set may be transmitted to the machine learning process Li (i<N) after, for example, adjusting the scales to be matched among the elements and may be set to the target to be inputted to the machine learning model. A specific example where the input data set is set to the target to be inputted to the machine learning model after adjusting the scales to be matched among the elements will be described below with reference to, for example, FIGS. 20 to 24.

For example, the numerical simulation SIMi (i<N) may transmit the input data set {n,M,r} representing a matrix equation relating to LU decomposition to the machine learning process Li (i<N). As a result of the transmission, the numerical simulation SIMi (i<N) causes the machine learning process Li (i<N) to calculate a solution vector z and executes the pre-processing.

The input data set may be transmitted to the machine learning process Li (i<N) after, for example, adjusting the scales to be matched among the elements and may be set to the target to be inputted to the machine learning model. A specific example where the input data set is set to the target to be inputted to the machine learning model after adjusting the scales to be matched among the elements will be described below with reference to, for example, FIGS. 20 to 24.

The information processing apparatus 100 calculates an index value indicating desirability of the calculated z as solving precision of the machine learning model. The index value is, for example, ||r||/||b||. The information processing apparatus 100 is configured not to update the machine learning model in a machine learning process Li (i≥N) after, for example, the solving precision of the machine learning model gets greater than or equal to predetermined precision.

Thereafter, the numerical simulation SIMi (i≥N) transmits the input data set {n,M,r} representing a matrix equation to the machine learning process Li (i≥N). The machine learning process Li (i≥N) inputs the received input data set {n,M,r} to the machine learning model and transmits the solution vector z acquired by the machine learning model as a result of the input to the numerical simulation SIMi (i≥N).

The input data set may be transmitted to the machine learning process Li (i<N) after, for example, adjusting the scales to be matched among the elements and may be set to the target to be inputted to the machine learning model. A specific example where the input data set is set to the target to be inputted to the machine learning model after adjusting the scales to be matched among the elements will be described below with reference to, for example, FIGS. 20 to 24.

Thus, the information processing apparatus 100 may enable the numerical simulation SIMi to solve the matrix equation by using the machine learning model having relatively high solving precision if any so that reduction of the amount of processing in the numerical simulation SIMi may be attempted. Thus, the information processing apparatus 100 may attempt improvement of the processing speed of the numerical simulation SIMi and improvement of the solving precision.

The information processing apparatus 100 may attempt reduction of the amount of processing involved in the numerical simulation SIMi (i≥N). Thus, the information processing apparatus 100 may cancel increases of the amount of processing due to the updates of the machine learning model in the machine learning process Li (i<N). As a result, the information processing apparatus 100 may attempt further reduction of the amount of processing all over the plurality of numerical simulations SIMi as the numerical simulation SIMi is repeated more.

The information processing apparatus 100 may try a method that solves a matrix equation by using the machine learning model in the initial several numerical simulations SIMi and a method that solves a matrix equation without using the machine learning model and calculate the solving precision of each of the methods. The information processing apparatus 100 may solve a matrix equation according to the method having the higher solving precision in the subsequent numerical simulations SIMi.

There may be a case where the information processing apparatus 100 may determine whether the machine learning model is not to be updated in the machine learning process Li in the middle of the numerical simulation SIMi. Next, effects acquired by the information processing apparatus 100 will be described with reference to FIG. 18.

Figure 18:
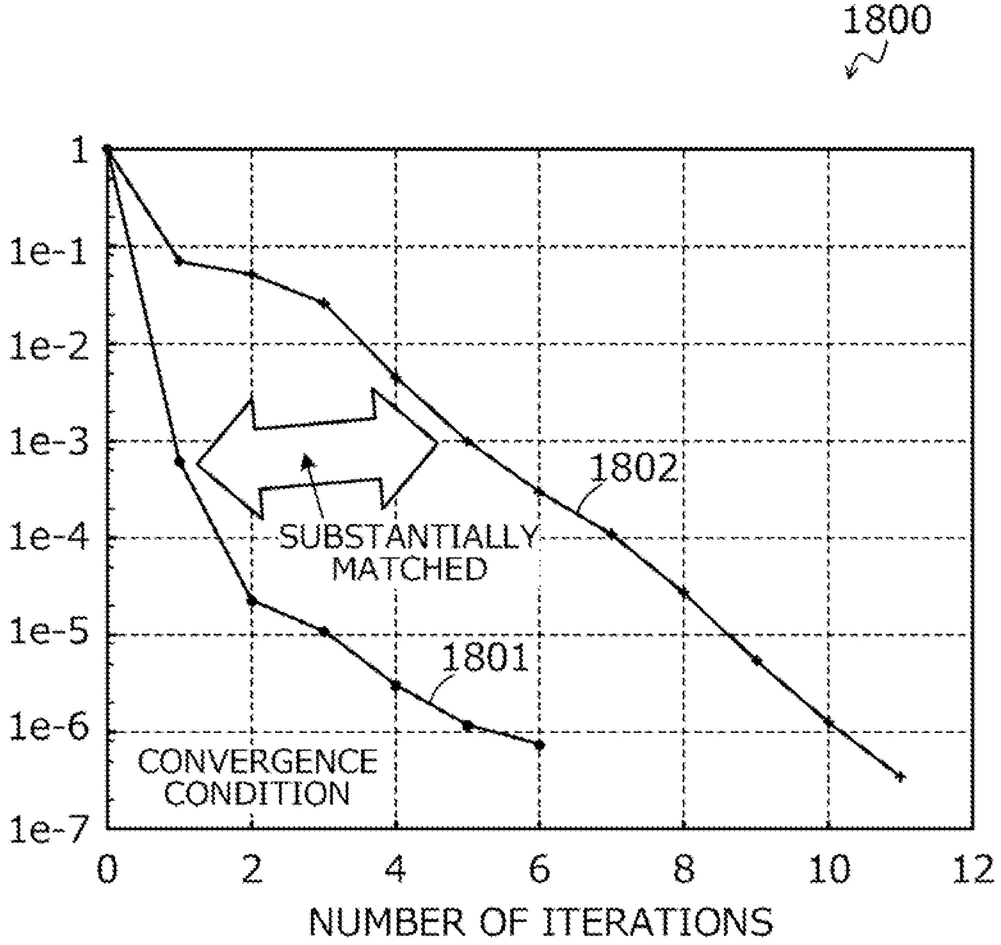
FIG. 18 is an explanatory diagram (Part 4) illustrating the second operational example of the information processing apparatus.

Referring to FIG. 18, it is assumed that the information processing apparatus 100 has solved a three-dimensional Poisson's equation representing a certain problem with a numerical simulation. In this case, it is assumed that the information processing apparatus 100 has used a convergence condition of $\|b-Ax\|<\varepsilon\|b\|$. Here, $\varepsilon=1.0\times10^{-6}$. It is assumed that the information processing apparatus 100 has increased the number of training data sets by adding a perturbation to b. It is assumed that the machine learning model is a neural network including an input layer of 3750 nodes, a hidden layer of 8192 nodes, and an output layer of 3750 nodes.

FIG. 18 illustrates a graph 1800 which is a graph representing a relative residual to the number of CG method iterations in a case where a three-dimensional Poisson's equation representing a certain problem is solved. The number of CG method iterations corresponds to the number of iterations in the iterative solution technique. The relative residual is, for example, $\|b-Ax\|/\|b\|$. A line 1802 indicates a property of CG method with pre-processing in the past. As indicated by the line 1802, CG method with pre-processing in the past repeats steps of the iterative solution technique about 11 times until the convergence condition is satisfied, which lowers the processing speed.

On the other hand, a line 1801 indicates a property provided when the information processing apparatus 100 solves a three-dimensional Poisson's equation representing a certain problem according to CG method using a machine learning model as the pre-processing. As indicated by the line 1801, the information processing apparatus 100 may reduce the number of iterations of the steps of the iterative solution technique to the number satisfying the convergence condition and may thus attempt improvement of the processing speed. The information processing apparatus 100 at the first iteration may reduce the residual to the residual equal to that of the fifth iteration of the numerical simulation in the past and may efficiently solve the three-dimensional Poisson's equation.

(Overall Processing Procedure in Operational Example 2)

Since an example of an overall processing procedure in Operational Example 2 to be executed by the information processing apparatus 100 is similar to, for example, the example of the overall processing procedure in Operational Example 1 illustrated in FIG. 13, repetitive description will be omitted. The information processing apparatus 100 in step S1302 executes a solving process, which will be described below with reference to FIG. 19, instead of the solving process illustrated in FIG. 14.

(Solving Processing Procedure in Operational Example 2)

Figure 19:
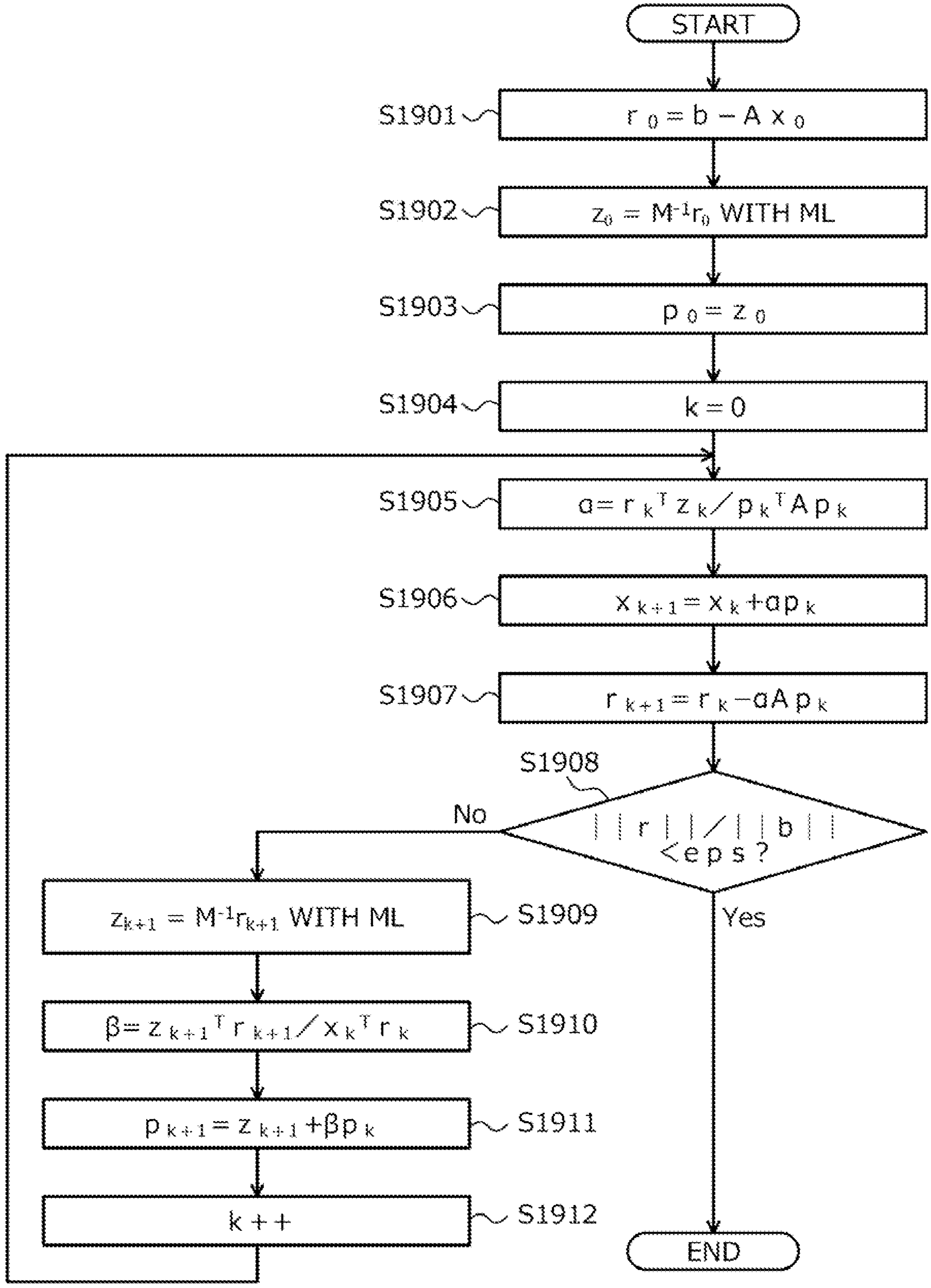
FIG. 19 is a flowchart illustrating an example of a solving processing procedure in Operational Example 2.

With reference to FIG. 19, an example of a solving processing procedure in Operational Example 2 to be executed by the information processing apparatus 100 will be described next. The solving process is implemented, for example, by the CPU 301, the storage area such as the memory 302 or the recording medium 305, and the network I/F 303 illustrated in FIG. 3.

FIG. 19 is a flowchart illustrating an example of a solving processing procedure in Operational Example 2. Referring to FIG. 19, the information processing apparatus 100 calculates $r_0=b-Ax_0$ (step S1901).

Next, the information processing apparatus 100 calculates $z_0=M^{-1}r_0$ through machine learning (step S1902). The information processing apparatus 100 calculates $p_0=z_0$ (step S1903).

Next, the information processing apparatus 100 sets k=0 (step S1904). The information processing apparatus 100 calculates $\alpha=r_k^Tz_k/p_k^TAp_k$ (step S1905).

Next, the information processing apparatus 100 calculates $x_{k+1}=x_k+\alpha p_k$ (step S1906). The information processing apparatus 100 calculates $r_{k+1}=r_k+\alpha Ap_k$ (step S1907).

Next, the information processing apparatus 100 determines whether $\|r\|/\|b\|<eps$ is satisfied or not (step S1908). If $\|r\|/\|b\|<eps$ is satisfied (Yes in step S1908), the information processing apparatus 100 ends the solving process. On the other hand, if $\|r\|/\|b\|<eps$ is not satisfied (No in step S1908), the information processing apparatus 100 proceeds to the processing in step S1909.

In step S1909, the information processing apparatus 100 calculates $z_{k+1}=M^{-1}r_{k+1}$ through machine learning (step S1909). Next, the information processing apparatus 100 calculates $\beta=z_{k+1}^Tr_{k+1}/x_k^Tr_k$ (step S1910). The information processing apparatus 100 calculates $p_{k+1}=z_{k+1}+\beta p_k$ (step S1911).

Next, the information processing apparatus 100 increments k (step S1912). The information processing apparatus 100 returns to the processing in step S1905. Thus, the information processing apparatus 100 may acquire the solution x to the linear equation Ax=b by using a machine learning model.

(Specific Examples where Target to be Inputted to Machine Learning Model is Set)

Next, with reference to FIGS. 20 to 24, specific examples will be described in which the information processing apparatus 100 sets a target to be inputted to a machine learning model by adjusting the scales to be matched among elements of a matrix in updating or using a machine learning model in the first operational example or the second operational example.

FIGS. 20 to 24 are explanatory diagrams illustrating specific examples in which a target to be inputted to a machine learning model is set. First, with reference to FIG.

20, a first specific example will be described in which a target to be inputted to a machine learning model is set.

Figure 20:
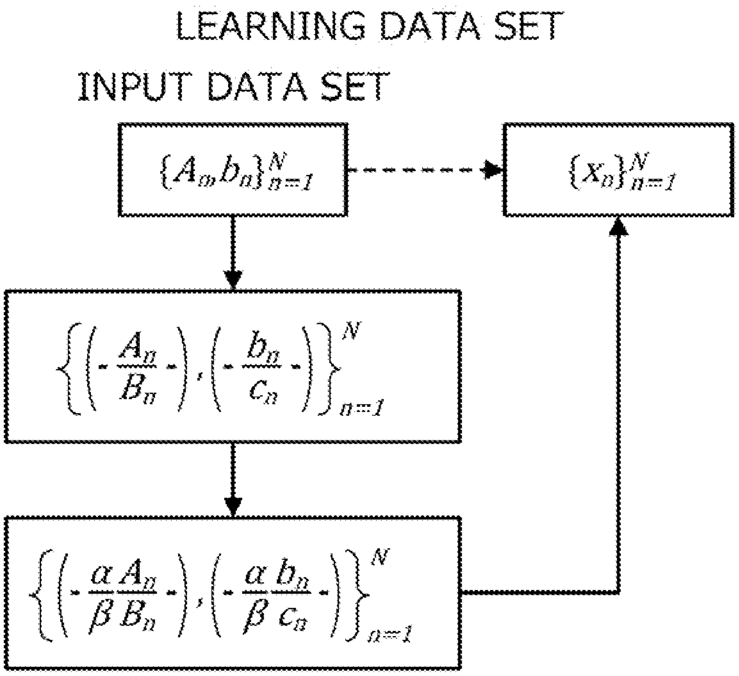
FIG. 20 is an explanatory diagram (Part 1) illustrating a specific example in which a target to be inputted to a machine learning model is set.

Referring to FIG. 20, it is assumed that the information processing apparatus 100 acquires a training data set $\{n,A_n,b_n,x_n\}^N_{n=1}$. In this case, the information processing apparatus 100 divides $\{A_n,b_n\}^N_{n=1}$ of the training data set $\{n,A_n,b_n,x_n\}^N_{n=1}$ into a plurality of blocks.

In the example in FIG. 20, the information processing apparatus 100 divides $A_n$ into a block $A_n$ and a block $B_n$ and divides $b_n$ into blocks $b_n$ and $c_n$. The information processing apparatus 100 changes the scales by multiplying $\{A_n!B_n, b_n!c_n\}^N_{n=1}$ by scaling factors $\alpha$ and $\beta$. "!" is used as a symbol indicating a separator between blocks in a sentence for convenience. ! corresponds to a lateral broken line indicating a separator between blocks in drawings. The information processing apparatus 100 sets a combination of $\{\alpha A_n!\beta B_n, \alpha b_n!\beta c_n\}^N_{n=1}$ after the scales are changed and $\{x_n\}^N_{n=1}$ of a training data set $\{n,A_n,b_n,x_n\}^N_{n=1}$ to a target to be inputted.

Referring to FIG. 20, it is assumed that the information processing apparatus 100 has acquired an input data set $\{n,A_n,b_n\}^N_{n=1}$. In this case, the information processing apparatus 100 divides $\{A_n,b_n\}^N_{n=1}$ of the input data set $\{n,A_n,b_n\}^N_{n=1}$ into a plurality of blocks.

In the example in FIG. 20, the information processing apparatus 100 divides $A_n$ into a block $A_n$ and a block $B_n$ and divides $b_n$ into blocks $b_n$ and $c_n$. The information processing apparatus 100 changes the scales by multiplying $\{A_n!B_n, b_n!c_n\}^N_{n=1}$ by scaling factors $\alpha$ and $\beta$. The information processing apparatus 100 sets $\{\alpha A_n!\beta B_n,\alpha b_n!\beta c_n\}^N_{n=1}$ after the scales are changed to the target to be inputted.

Figure 21:
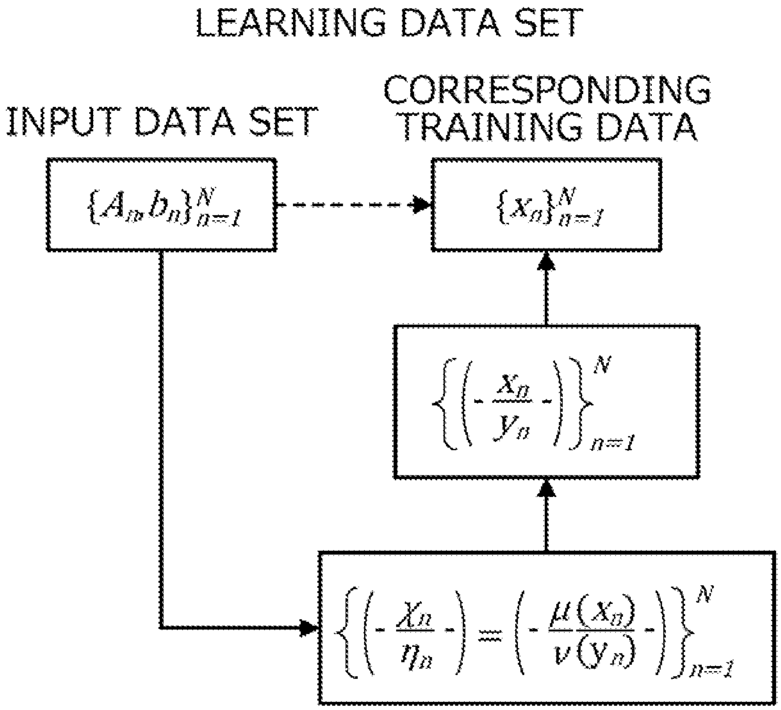
FIG. 21 is an explanatory diagram (Part 2) illustrating a specific example in which a target to be inputted to a machine learning model is set.

Next, with reference to FIG. 21, a second specific example will be described in which a target to be inputted to a machine learning model is set. Referring to FIG. 21, the information processing apparatus 100 has predetermined scaling functions $\mu(\bullet)$, $v(\bullet)$.

Referring to FIG. 21, it is assumed that the information processing apparatus 100 has acquired a training data set $\{n,A_n,b_n,x_n\}^N_{n=1}$. In this case, the information processing apparatus 100 divides $\{x_n\}^N_{n=1}$ of the training data set $\{n,A_n,b_n,x_n\}^N_{n=1}$ into a plurality of blocks.

In the example in FIG. 21, the information processing apparatus 100 divides $x_n$ into a block $x_n$ and a block $y_n$. The information processing apparatus 100 changes the scales by substituting $\{x_n!y_n\}^N_{n=1}$ after the division into each of the scaling functions $\mu(\bullet)$, $v(\bullet)$. The information processing apparatus 100 sets a combination of $\{\chi_n!\eta_n\}^N_{n=1}=\{\mu(x_n)!v(y_n)\}^N_{n=1}$ after the scales are changed and $\{A_n,b_n\}^N_{n=1}$ of the training data set $\{n,A_n,b_n,x_n\}^N_{n=1}$ to a target to be inputted.

Referring to FIG. 21, it is assumed that the information processing apparatus 100 has acquired an input data set $\{n,A_n,b_n\}^N_{n=1}$. In this case, the information processing apparatus 100 acquires $\{\chi_n!\eta_1\}^N_{n=1}=\{\mu(x_n)!v(y_n)\}^N_{n=1}$ by inputting the input data set $\{n,A_n,b_n\}^N_{n=1}$ to the machine learning model. The information processing apparatus 100 substitutes $\{\chi_n!\eta_n\}^N_{n=1}$ into the inverse functions of the scaling functions $\mu(\bullet)$, $v(\bullet)$ and acquires $\{x_n\}^N_{n=1}$.

Figure 22:
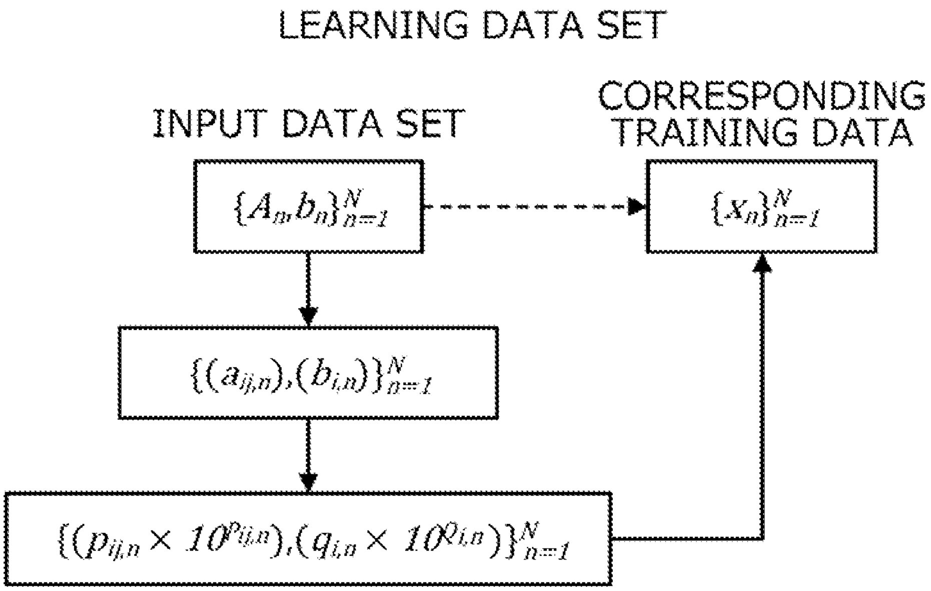
FIG. 22 is an explanatory diagram (Part 3) illustrating a specific example in which a target to be inputted to a machine learning model is set.

Next, with reference to FIG. 22, a third specific example will be described in which a target to be inputted to a machine learning model is set. Referring to FIG. 22, it is assumed that the information processing apparatus 100 has acquired a training data set $\{n,A_n,b_n,x_n\}^N_{n=1}$. In this case, it is assumed that the information processing apparatus 100 handles $\{A_n,b_n\}^N_{n=1}$ of the training data set $\{n,A_n,b_n,x_n\}^N_{n=1}$ in units of an element $a_{ij,n}$ at the ith row and jth column of $A_n$ and an element $b_{i,n}$ at the ith row of $b_n$. For example, it is assumed that the information processing apparatus 100 handles $\{A_n,b_n\}^N_{n=1}$ as $\{(a_{ij,n}),(b_{i,n})\}^N_{n=1}$.

The information processing apparatus 100 converts $\{(a_{ij,n}),(b_{i,n})\}^N_{n=1}$ to a floating point notation. The information processing apparatus 100 extracts information of two channels of a cardinal number part $\{p_{ij,n},q_{i,n}\}^N_{n=1}$ and an index part $\{P_{ij,n},Q_{i,n}\}^N_{n=1}$ from $\{(p_{ij,n}\times10\hat{}P_{ij,n}),(q_{i,n}\times10\hat{}Q_{i,n})\}^N_{n=1}$ after the conversion. The information processing apparatus 100 sets a combination of the extracted information of the two channels and $\{x_n\}^N_{n=1}$ of the training data set $\{n,A_n,b_n,x_n\}^N_{n=1}$ to a target to be inputted.

Referring to FIG. 22, it is assumed that the information processing apparatus 100 has acquired an input data set $\{n,A_n,b_n\}^N_{n=1}$. In this case, it is assumed that the information processing apparatus 100 handles $\{A_n,b_n\}^N_{n=1}$ of the input data set $\{n,A_n,b_n\}^N_{n=1}$ as $\{(a_{ij,n}),(b_{i,n})\}^N_{n=1}$ in units of an element $a_{ij,n}$ at the ith row and jth column of $A_n$ and an element $b_{i,n}$ at the ith row of $b_n$.

The information processing apparatus 100 converts $\{(a_{ij,n}),(b_{i,n})\}^N_{n=1}$ to a floating point notation. The information processing apparatus 100 extracts information of two channels of a cardinal number part $\{p_{ij,n},q_{i,n}\}^N_{n=1}$ and an index part $\{P_{ij,n},Q_{i,n}\}^N_{n=1}$ from $\{(p_{ij,n}\times10\hat{}P_{ij,n}),(q_{i,n}\times10\hat{}Q_{i,n})\}^N_{n=1}$ after the conversion. The information processing apparatus 100 sets the extracted information of the two channels to the target to be inputted.

Next, with reference to FIGS. 23 and 24, effects of setting of a target to be inputted to the machine learning model by adjusting scales to be matched among elements will be described.

Figure 23:
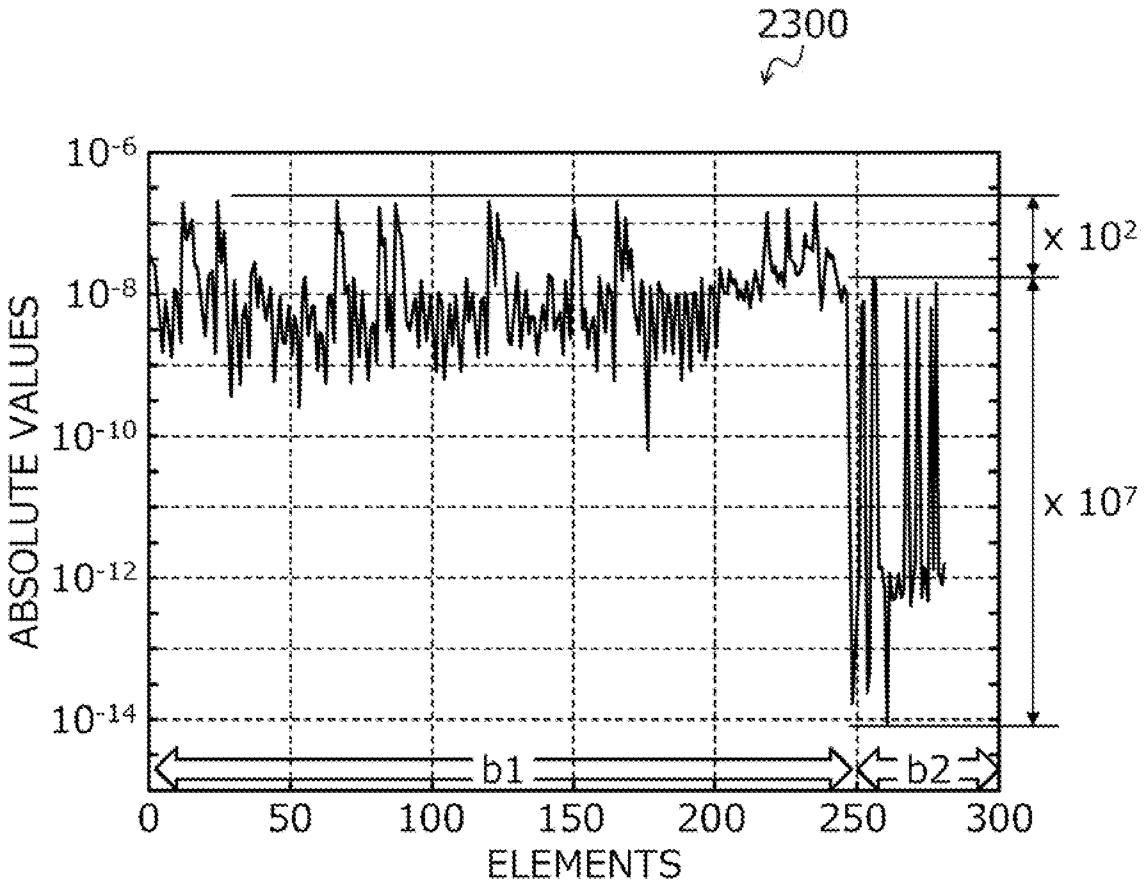
FIG. 23 is an explanatory diagram (Part 4) illustrating a specific example in which a target to be inputted to a machine learning model is set.

FIG. 23 illustrates a graph 2300 representing the sizes of the elements in the blocks b1 and b2 dividing the right-side vector b. The horizontal axis indicates 300 elements. The vertical axis indicates absolute values of the sizes of the elements. As illustrated in the graph 2300, the right-side vector b includes elements having different scales.

Figure 24:
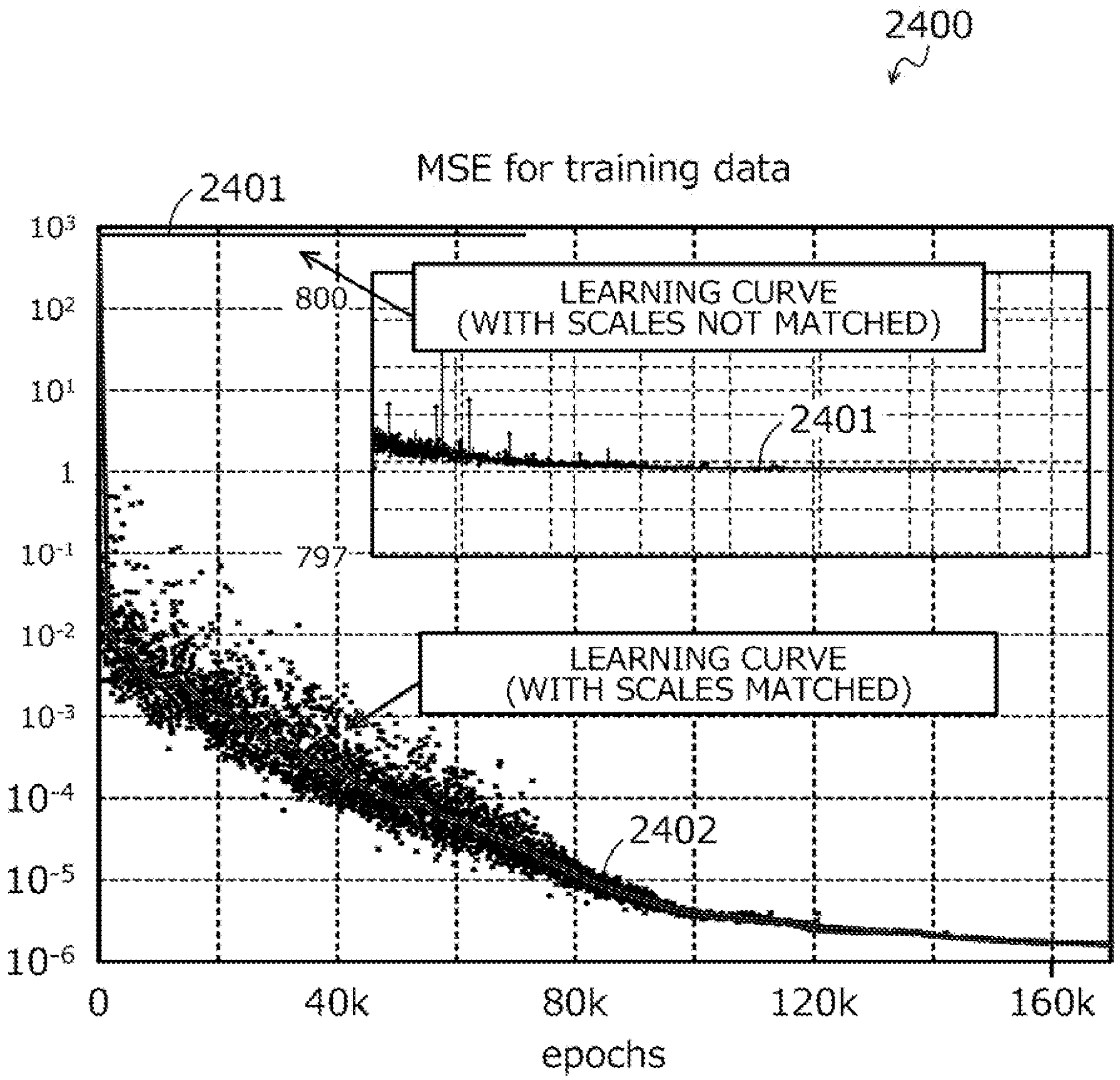
FIG. 24 is an explanatory diagram (Part 5) illustrating a specific example in which a target to be inputted to a machine learning model is set.

FIG. 24 illustrates a graph 2400 representing residuals to the number of epochs. The number of epochs corresponds to the number of training data sets. A smaller residual indicates higher solving precision of the machine learning model. A line 2401 is a learning curve in a case where the scales are not matched among the elements according to a learning method in the past. As indicated by the line 2401, in the learning method in the past, it is difficult to improve the solving precision of the machine learning model even by increasing the number of training data sets.

A line 2402 is a learning curve in a case where the scales are matched among the elements by the information processing apparatus 100. As indicated by the line 2402, the information processing apparatus 100 adjusts the scales to be matched among the elements so that the solving precision of the machine learning model may be improved by an increased number of training data sets.

(Setting Processing Procedure)

Next, an example of a setting processing procedure to be executed by the information processing apparatus 100 will be described with reference to FIGS. 25 to 27. The setting process is, for example, implemented by the CPU 301, a storage area such as the memory 302 or the recording medium 305, and the network I/F 303 that are illustrated in FIG. 3.

Figure 25:
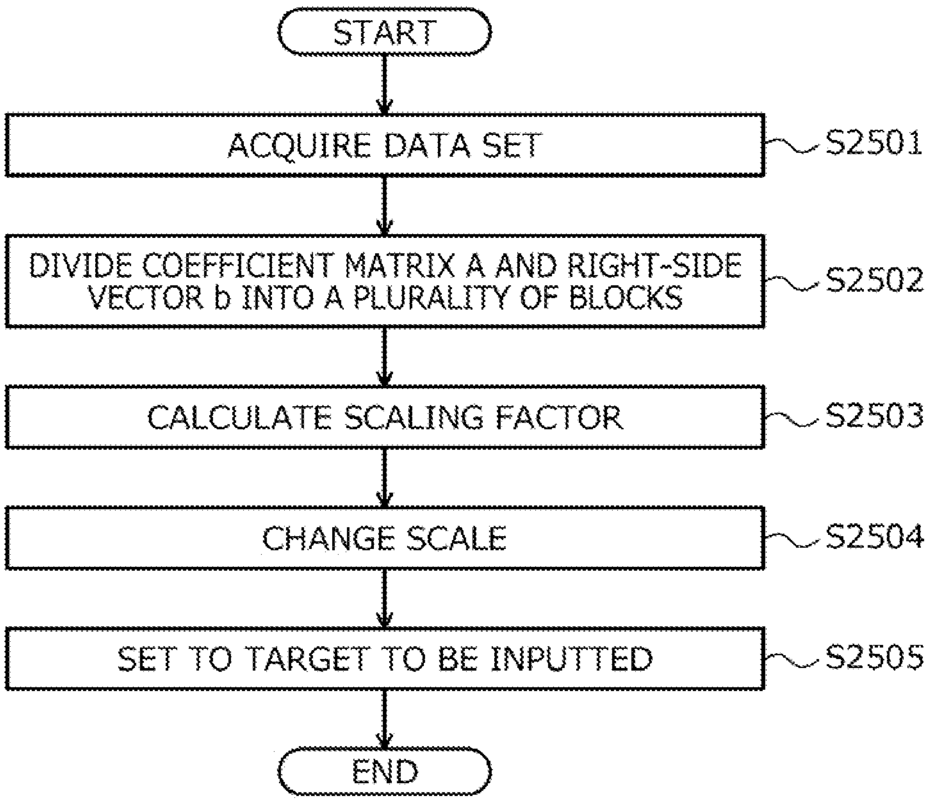
FIG. 25 is a flowchart illustrating a first example of a setting processing procedure.

FIG. 25 is a flowchart illustrating a first example of the setting processing procedure. The first example corresponds to the first specific example illustrated in FIG. 20. Referring to FIG. 25, the information processing apparatus 100 acquires a data set (step S2501). The data set is an input data set or a training data set.

Next, the information processing apparatus 100 divides a coefficient matrix A and a right-side vector b included in the acquired data set into a plurality of blocks such that a block within the coefficient matrix A and a block within the right-side vector b may be a pair of corresponding blocks (step S2502). For example, the coefficient matrix A is divided into a block A1 and a block A2. For example, the right-side vector b is divided into a block b1 and a block b2. For example, a pair of the block A1 and the block b1 is a pair of blocks including elements of an identical attribute and corresponding to each other. Also, for example, a pair of the block A2 and the block b2 is a pair of corresponding blocks including elements of an identical attribute.

Next, the information processing apparatus 100 calculates a scaling factor based on the sizes of elements included in each block of the plurality of blocks (step S2503). The information processing apparatus 100 calculates, for example, a common scaling factor for each pair of the corresponding blocks. For example, for the pair of the block A1 and the block b1, the information processing apparatus 100 calculates a scaling factor $\alpha$ based on an element with a maximum absolute value within the pair. For example, for the pair of the block A2 and the block b2, the information processing apparatus 100 calculates a scaling factor $\beta$based on an element with a maximum absolute value within the pair.

Next, for each pair of corresponding blocks, the information processing apparatus 100 multiplies each element of the plurality of elements included in the blocks by the scaling factor calculated for the pair and changes the scale of each element (step S2504).

Next, the information processing apparatus 100 sets the data set after the scales are changed to the target to be inputted (step S2505). The information processing apparatus 100 ends the setting process. Thus, the information processing apparatus 100 may improve the solving precision of the machine learning model.

Figure 26:
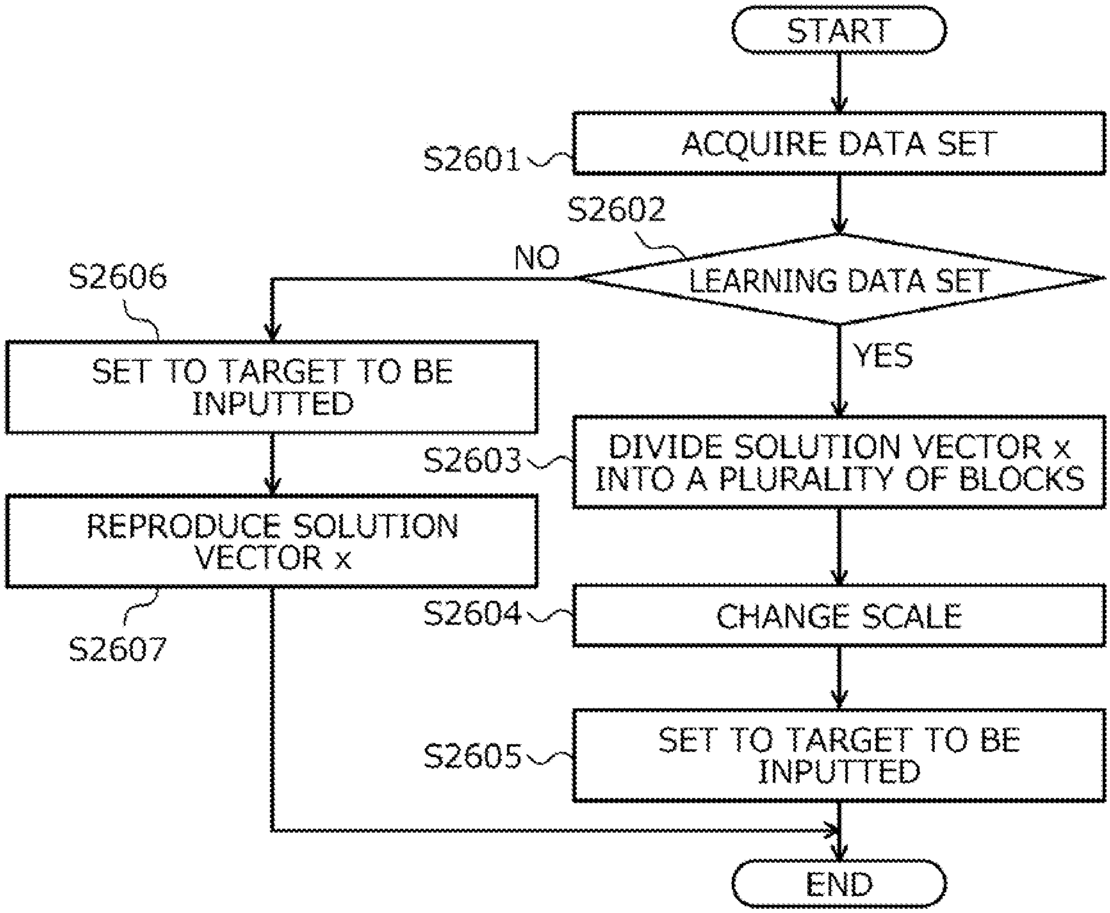
FIG. 26 is a flowchart illustrating a second example of the setting processing procedure.

FIG. 26 is a flowchart illustrating a second example of the setting processing procedure. The second example corresponds to the second specific example illustrated in FIG. 21. Referring to FIG. 26, the information processing apparatus 100 acquires a data set (step S2601). The data set is an input data set or a training data set.

Next, the information processing apparatus 100 determines whether the acquired data set is a training data set or not (step S2602). If the acquired data set is a training data set (Yes in step S2602), the information processing apparatus 100 proceeds to processing in step S2603. On the other hand, if the acquired data set is an input data set (No in step S2602), the information processing apparatus 100 proceeds to processing in step S2606.

In step S2603, the information processing apparatus 100 divides a solution vector x included in the data set into a plurality of blocks (step S2603). The information processing apparatus 100 changes scales of elements included in each block of the plurality of blocks based on a scaling function (step S2604).

Next, the information processing apparatus 100 sets the data set after the scales are changed to the target to be inputted (step S2605). The information processing apparatus 100 ends the setting process.

In step S2606, the information processing apparatus 100 sets the acquired data set to the target to be inputted (step S2606). Next, once a plurality of blocks corresponding to the data set is acquired by the machine learning model, the information processing apparatus 100 reproduces the solution vector x from the plurality of blocks based on the inverse function of the scaling function (step S2607).

The information processing apparatus ends the setting process. Thus, the information processing apparatus 100 may improve the solving precision of the machine learning model.

Figure 27:
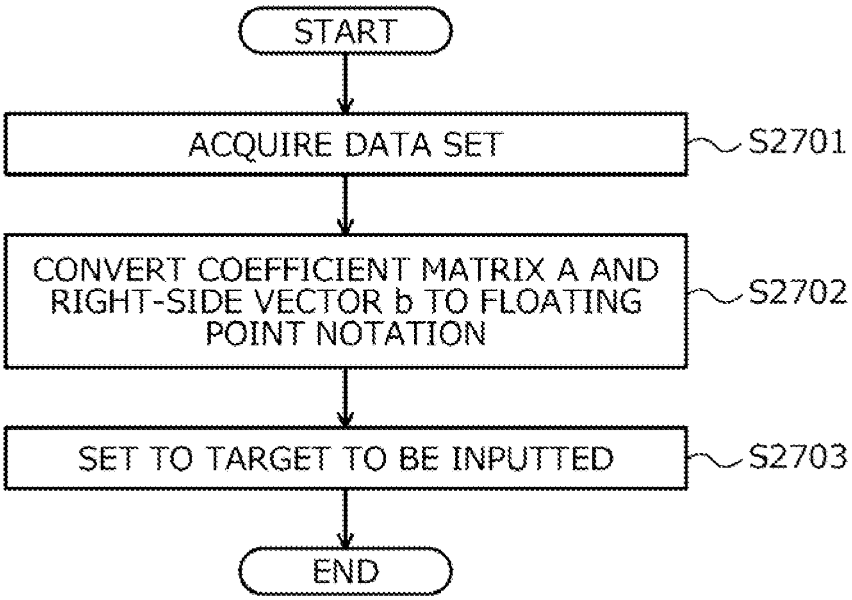
FIG. 27 is a flowchart illustrating a third example of the setting processing procedure.

FIG. 27 is a flowchart illustrating a third example of the setting processing procedure. The third example corresponds to the third specific example illustrated in FIG. 22. Referring to FIG. 27, the information processing apparatus 100 acquires a data set (step S2701). The data set is an input data set or a training data set.

Next, the information processing apparatus 100 converts each of a coefficient matrix A and a right-side vector b included in the acquired data set to a floating point notation (step S2702). The information processing apparatus 100 sets a matrix representing a cardinal number part, a matrix representing an index part, and a solution vector x of the acquired data set to a target to be inputted (step S2703).

Thereafter, the information processing apparatus 100 ends the setting process. Thus, the information processing apparatus 100 may improve the solving precision of the machine learning model.

As described above, with the information processing apparatus 100, a matrix forming a predetermined matrix equation may be acquired. With the information processing apparatus 100, based on an attribute of each element of a plurality of elements included in the acquired matrix, the acquired matrices may be divided into a plurality of blocks each including elements having an identical attribute. With the information processing apparatus 100, the scale of each element of the plurality of elements included in each block of the plurality of divided blocks may be changed. With the information processing apparatus 100, the matrix after the scale of each element of the plurality of elements included in each of the blocks is changed may be set to a target to be inputted to a machine learning model that performs a matrix operation. Thus, the information processing apparatus 100 may learn the machine learning model having relatively high solving precision because the scales may be matched among elements.

With the information processing apparatus 100, each matrix of a first matrix representing a coefficient of a predetermined matrix equation and a third matrix representing a product of the first matrix and a second matrix representing a solution of the predetermined matrix equation may be acquired. Thus, the information processing apparatus 100 may learn the machine learning model having relatively high solving precision because the scales may be matched among elements in the first matrix and the third matrix.

With the information processing apparatus 100, a second matrix representing a solution to a predetermined matrix equation may be acquired. Thus, the information processing apparatus 100 may learn the machine learning model having relatively high solving precision because the scales may be matched among elements in the second matrix.

With the information processing apparatus 100, for the acquired matrix, a fourth matrix representing a cardinal number forming each element of a plurality of elements included in the matrix and a fifth matrix representing an index forming each element of the plurality of elements included in the same matrix may be identified. With the information processing apparatus 100, for the acquired matrix, the identified fourth matrix and the identified fifth matrix may be set to a target to be inputted to the machine learning model. Thus, the information processing apparatus 100 may convert the first matrix and the third matrix to other representations and may learn the machine learning model having relatively high solving precision based on the elements having the matched scales.

With the information processing apparatus 100, a matrix equation to be solved by the iterative solution technique may be adopted for the predetermined matrix equation. With the information processing apparatus 100, a target to be inputted may be set before the predetermined matrix equation is solved by the iterative solution technique. With the information processing apparatus 100, in response to the input of the set target to be inputted to the machine learning model, the second matrix outputted from the machine learning model may be set to the initial value to be used for solving the predetermined matrix equation by the iterative solution technique. Thus, the information processing apparatus 100 may adjust the scales to be matched among the elements and may acquire a solution with high precision by using the machine learning model.

With the information processing apparatus 100, a matrix equation to be solved by the iterative solution technique may be adopted for the predetermined matrix equation. With the information processing apparatus 100, a target to be inputted may be set after the predetermined matrix equation is solved by the iterative solution technique. With the information processing apparatus 100, the machine learning model may be updated based on the set target to be inputted. Thus, the information processing apparatus 100 may efficiently learn the machine learning model having relatively high solving precision while a simulation is being executed. The information processing apparatus 100 may attempt reduction of the processing load involved in learning by using, for example, the matrix equation used for a simulation.

With the information processing apparatus 100, processing may be performed in a case where a plurality of simulations that solve matrix equations of an identical type, which are different from each other, by the iterative solution technique is executed. With the information processing apparatus 100, every time a simulation is executed, a matrix forming a matrix equation to be solved by the iterative solution technique when the simulation is executed may be acquired. Thus, the information processing apparatus 100 may update the machine learning model through the plurality of simulations so that the machine learning model may be updated efficiently. Thus, the information processing apparatus 100 may achieve higher solving precision of the machine learning model as more simulations are executed. The information processing apparatus 100 may use the machine learning model through a plurality of simulations so that a solution may be acquired with higher precision in a simulation that is performed later.

With the information processing apparatus 100, a matrix equation including a pre-processing matrix to be used for pre-processing including changing an eigenvalue distribution of any matrix equation in the iterative solution technique may be adopted as the predetermined matrix equation. With the information processing apparatus 100, a target to be inputted may be set before the pre-processing is performed in the iterative solution technique. With the information processing apparatus 100, in response to the input of the set target to be inputted to the machine learning model, the pre-processing may be performed based on the second matrix outputted from the machine learning model. Thus, the information processing apparatus 100 may adjust the scales to be matched among the elements and may acquire a solution with high precision by using the machine learning model.

With the information processing apparatus 100, a matrix equation including a pre-processing matrix to be used for pre-processing including changing an eigenvalue distribution of any matrix equation in the iterative solution technique may be adopted as the predetermined matrix equation. With the information processing apparatus 100, a target to be inputted may be set after the pre-processing is performed in the iterative solution technique. With the information processing apparatus 100, the machine learning model may be updated based on the set target to be inputted. Thus, the information processing apparatus 100 may efficiently learn the machine learning model having relatively high solving precision while a simulation is being executed. The information processing apparatus 100 may attempt reduction of the processing load involved in learning by using, for example, the matrix equation used for a simulation.

With the information processing apparatus 100, processing may be performed in a case where a plurality of simulations that solve matrix equations of an identical type, which are different from each other, by the iterative solution technique is executed. With the information processing apparatus 100, every time a simulation is to be executed, a matrix forming a matrix equation to be used for pre-processing including changing an eigenvalue distribution of any matrix equation may be acquired in the iterative solution technique when the simulation is executed. Thus, the information processing apparatus 100 may update the machine learning model through the plurality of simulations so that the machine learning model may be updated efficiently. Thus, the information processing apparatus 100 may achieve higher solving precision of the machine learning model as more simulations are executed. The information processing apparatus 100 may use the machine learning model through a plurality of simulations so that a solution may be acquired with higher precision in a simulation that is performed later.

With the information processing apparatus 100, the machine learning model may be updated based on the set target to be inputted when, for example, it is determined that the solving precision of the machine learning model is less than a threshold value. Consequently, the information processing apparatus 100 may attempt reduction of the amount of processing.

With the information processing apparatus 100, the machine learning model may be updated based on a new target to be inputted acquired by adding a perturbation matrix to the set target to be inputted. Thus, the information processing apparatus 100 may easily improve the solving precision of the machine learning model.

With the information processing apparatus 100, a scaling factor acquired by multiplying an inverse of any element having a maximum absolute value by a predetermined value in each of the blocks may be calculated. With the information processing apparatus 100, each element of the plurality of elements included in each of the block may be multiplied by a scaling factor calculated for the block. Thus, the information processing apparatus 100 may learn the machine learning model having relatively high solving precision because the scales may be matched among the elements based on a proper scaling factor.

Notably, the information processing method described in the embodiment may be implemented by causing a computer, such as a PC or a workstation, to execute a program prepared in advance. The information processing program described in the embodiment is recorded in a computer-readable recording medium and is read from the recording medium by the computer and executed by the computer. The recording medium is a hard disk, a flexible disk, a compact disc (CD)-ROM, a magneto optical (MO) disk, a Digital Versatile Disc (DVD), or the like. The information processing program described in the embodiment may be distributed via a network, such as the Internet.

As to the aforementioned embodiment, the following supplement is further disclosed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing an information processing program that causes at least one computer to execute a process, the process comprising:

acquiring a plurality of matrices forming a certain matrix equation;

dividing the plurality of matrices into a plurality of block sets, each block set including a respective block originating from each of the plurality of matrices, such that a magnitude of an order of each element of all elements within the blocks belonging to each block set is identical to each other;

changing, for each block set of the plurality of block sets, a scale of each element belonging to the each block set; and setting the plurality of block sets after the scale is changed, as a target to be inputted to a machine learning model that performs a matrix operation;

training the machine learning model by inputting the plurality of block sets set as the target.

2. The non-transitory computer-readable recording medium according to claim 1, wherein the acquiring includes acquiring a first matrix and a third matrix, the first matrix being a matrix representing a coefficient of the certain matrix equation, the third matrix being a matrix representing a product of the first matrix and a second matrix representing a solution acquired as a result of performing a numerical simulation on the certain matrix equation.

3. The non-transitory computer-readable recording medium according to claim 2, wherein the acquiring includes acquiring the second matrix from the result of the numerical simulation performed on the certain matrix equation.

4. The non-transitory computer-readable recording medium according to claim 1, the process further comprising identifying a fourth matrix representing a cardinal number forming each element included in the plurality of matrices and a fifth matrix representing an index forming each element included in the plurality of matrices, wherein the setting includes setting the fourth matrix and the fifth matrix as the target to be inputted to the machine learning model.

5. The non-transitory computer-readable recording medium according to claim 1, the process further comprising:

after the training of the machine learning model, performing a simulation step on a second matrix equation to be solved, wherein the simulation step includes:

inputting, to the trained machine learning model, a second target generated by performing the acquiring, the dividing, the changing, and the setting on the second matrix equation;

setting, as an initial value of a numerical simulation, an estimated solution outputted from the trained machine learning model in response to the inputting of the second target to the trained machine learning model; and performing the numerical simulation on the second matrix equation using the estimated solution set as the initial value to obtain a solution of the second matrix equation.

6. The non-transitory computer-readable recording medium according to claim 5, the process further comprising:

after the second matrix equation is solved by the performing of the simulation step, performing an update step on the trained machine learning model, wherein the update step includes:

re-training the machine learning model by using the second target as an input to the machine learning model and the solution of the second matrix equation as a correct answer.

7. An information processing method for a computer to execute a process comprising:

acquiring a plurality of matrices forming a certain matrix equation;

dividing the plurality of matrices into a plurality of block sets, each block set including a respective block originating from each of the plurality of matrices, such that a magnitude of an order of each element of all elements within the blocks belonging to each block set is identical to each other;

changing, for each block set of the plurality of block sets, a scale of each element belonging to the each block set; and setting the plurality of block sets after the scale is changed, as a target to be inputted to a machine learning model that performs a matrix operation;

training the machine learning model by inputting the plurality of block sets set as the target.

8. An information processing device comprising:

one or more memories; and one or more processors coupled to the one or more memories and the one or more processors configured to acquire a plurality of matrices forming a certain matrix equation;

divide the plurality of matrices into a plurality of block sets, each block set including a respective block originating from each of the plurality of matrices, such that a magnitude of an order of each element of all elements within the blocks belonging to each block set is identical to each other;

change, for each block set of the plurality of block sets, a scale of each element belonging to the each block set; and set the plurality of block sets after the scale is changed, as a target to be inputted to a machine learning model that performs a matrix operation;

train the machine learning model by inputting the plurality of block sets set as the target.

* * * * *